(12) United States Patent
Truscott et al.

(10) Patent No.: US 10,252,457 B2
(45) Date of Patent: *Apr. 9, 2019

(54) FLOW DIVERTER VALVE FOR AN EXTRUSION SYSTEM

(71) Applicant: NORDSON CORPORATION, Westlake, OH (US)

(72) Inventors: Michael K. Truscott, Chippewa Falls, WI (US); Stefan Wöstmann, Sassenberg (DE)

(73) Assignee: Nordson Corporation, Westlake, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/295,632

(22) Filed: Oct. 17, 2016

(65) Prior Publication Data
US 2017/0072612 A1    Mar. 16, 2017

Related U.S. Application Data

(63) Continuation-in-part of application No. 14/703,069, filed on May 4, 2015.

(51) Int. Cl.
*B29C 47/12* (2006.01)
*B29C 47/06* (2006.01)
(Continued)

(52) U.S. Cl.
CPC ...... *B29C 47/0816* (2013.01); *B29C 47/0009* (2013.01); *B29C 47/065* (2013.01);
(Continued)

(58) Field of Classification Search
CPC . B29C 47/124; B29C 47/145; B29C 47/0816; B29C 47/0009; B29C 47/065;
(Continued)

(56) References Cited

U.S. PATENT DOCUMENTS 3,886,963 A    6/1975  Jones et al.
3,918,865 A   11/1975  Nissel
(Continued)

FOREIGN PATENT DOCUMENTS

GB         1410777 A    10/1975
WO    2015/044959 A1    4/2015

OTHER PUBLICATIONS

European Application No. 16164924.9; European Search Report dated Oct. 5, 2016; 8 pages.
(Continued)

*Primary Examiner* — Robert J Grun
(74) *Attorney, Agent, or Firm* — Baker & Hostetler LLP

(57) ABSTRACT

A flow diverter for an extrusion die is disclosed. The flow diverter includes a body having an outer surface, an elongate opening that extends along a first axis, a set of input passages that extend from said outer surface through said body to said elongate opening, and a set of output passages that extend through said body from said elongate opening to said outer surface. The flow diverter also includes an adjustable valve positioned in said elongate opening. The adjustable valve also has a monolithic spool including a first recess and a second recess opposite to said first recess. The spool is rotatable with respect to said outer body between a first position in a first flow configuration, and a second position in a second, different flow configuration.

6 Claims, 17 Drawing Sheets

(51) Int. Cl.
  *B29C 47/08* (2006.01)
  *B29C 47/14* (2006.01)
  *B29C 47/00* (2006.01)
  *B29K 105/00* (2006.01)
  *B29L 9/00* (2006.01)
  *B29C 47/56* (2006.01)

(52) U.S. Cl.
  CPC .......... *B29C 47/124* (2013.01); *B29C 47/128* (2013.01); *B29C 47/145* (2013.01); *B29C 47/0021* (2013.01); *B29C 47/0026* (2013.01); *B29C 47/56* (2013.01); *B29K 2105/0067* (2013.01); *B29L 2009/00* (2013.01)

(58) Field of Classification Search
  CPC .............. B29C 47/128; B29C 47/0026; B29C 47/0021; B29C 47/56
  See application file for complete search history.

(56) References Cited

U.S. PATENT DOCUMENTS

| | | | |
|---|---|---|---|
| 3,924,990 A * | 12/1975 | Schrenk | B29C 47/0021 425/131.1 |
| 4,164,956 A | 8/1979 | Takahashi et al. | |
| 4,249,875 A | 2/1981 | Hart et al. | |
| 4,483,669 A | 11/1984 | Hahn | |
| 4,931,246 A | 6/1990 | Kudert et al. | |
| 5,076,777 A | 12/1991 | Schmitt | |
| 5,110,276 A | 5/1992 | Farnsworth et al. | |
| 5,616,350 A | 4/1997 | Wissmann et al. | |
| 5,711,349 A | 1/1998 | Wissmann | |
| 5,858,420 A | 1/1999 | Szajak et al. | |
| 6,174,478 B1 | 1/2001 | Silver | |
| 7,384,259 B2 | 6/2008 | Prue | |
| 8,490,643 B2 | 7/2013 | Hanson et al. | |
| 9,327,441 B2 | 5/2016 | Ulcej et al. | |
| 2004/0159964 A1 | 8/2004 | Lavoie et al. | |
| 2004/0213983 A1 | 10/2004 | Nodono et al. | |
| 2007/0184142 A1 | 8/2007 | Prue | |
| 2012/0073687 A1 | 3/2012 | Hanson et al. | |
| 2013/0224321 A1 | 8/2013 | Eloo et al. | |
| 2015/0001755 A1 | 1/2015 | Abe et al. | |
| 2016/0031145 A1 | 2/2016 | Truscott | |
| 2016/0223090 A1 | 8/2016 | G.R. | |
| 2016/0243743 A1 | 8/2016 | Hanson et al. | |
| 2016/0325476 A1 | 11/2016 | Truscott | |

OTHER PUBLICATIONS

European Patent Application No. 16164924.9; Extended Search Report; dated Jan. 13, 2017; 12 pages.

European search opinion dated Jan. 13, 2017 for EP Application No. 16164924.

European Patent Application No. 17195711.1; Extended Search Report; dated Feb. 15, 2018; 5 pages.

* cited by examiner

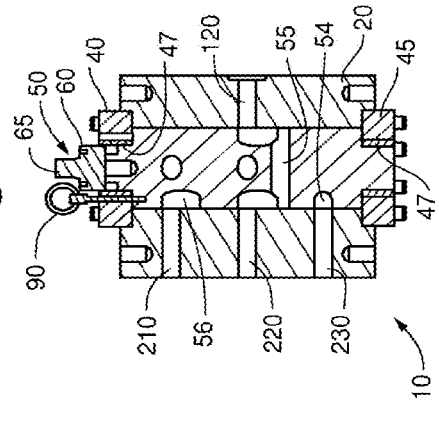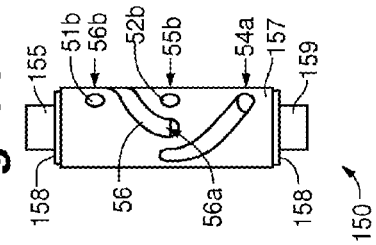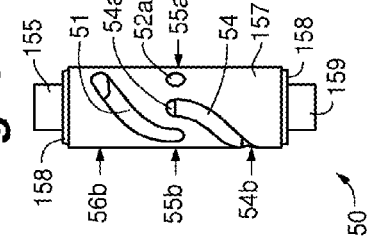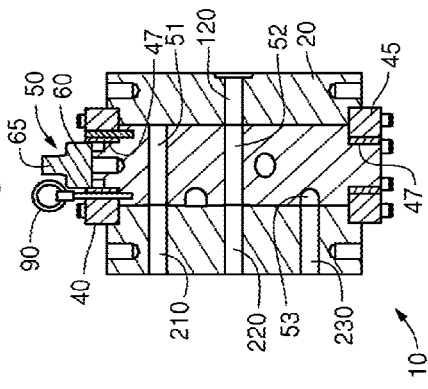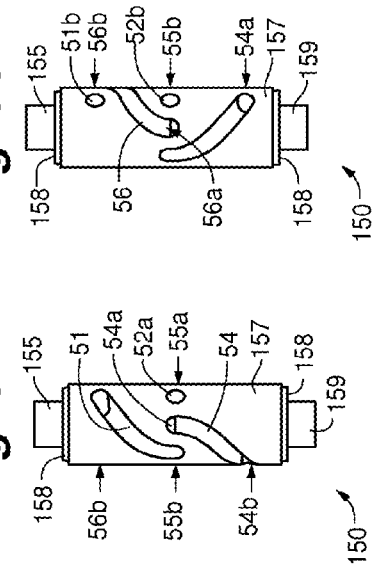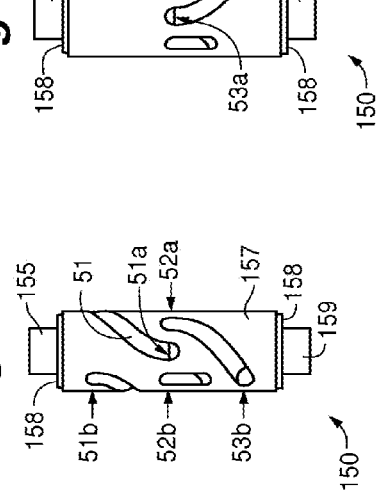

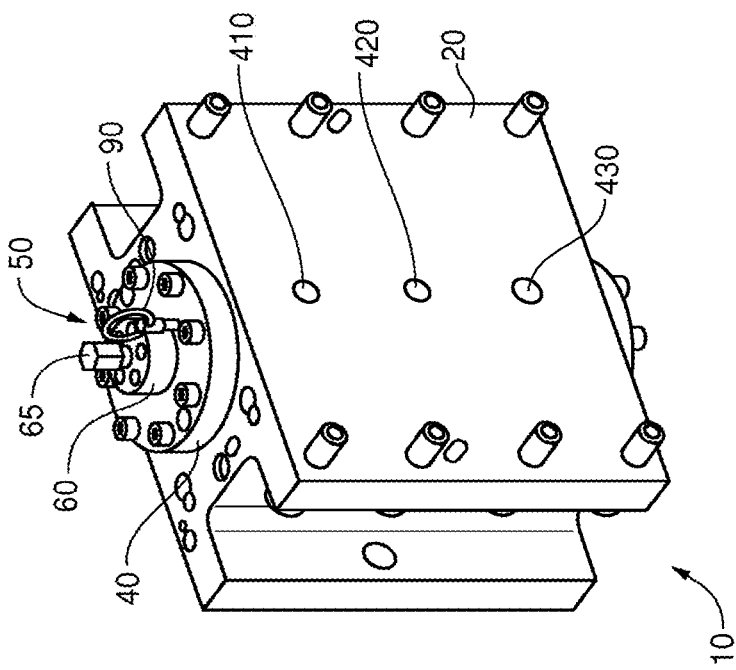
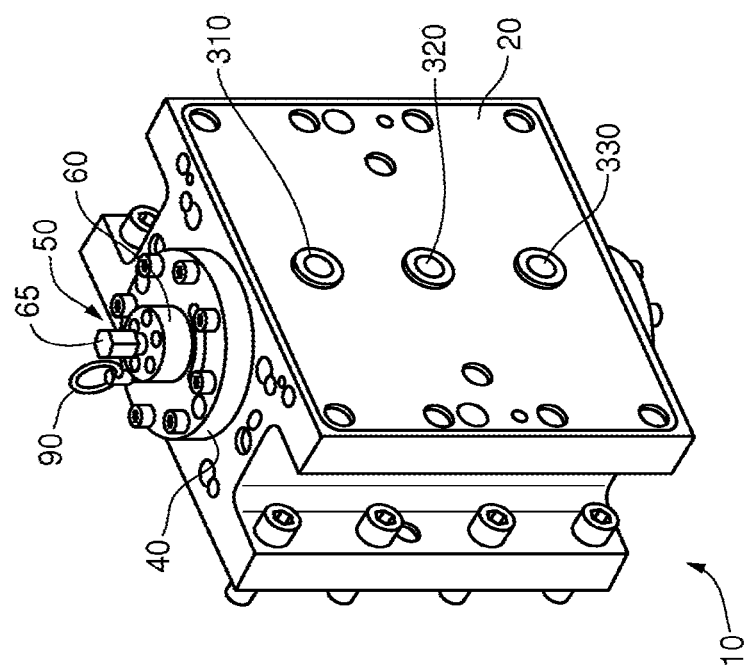

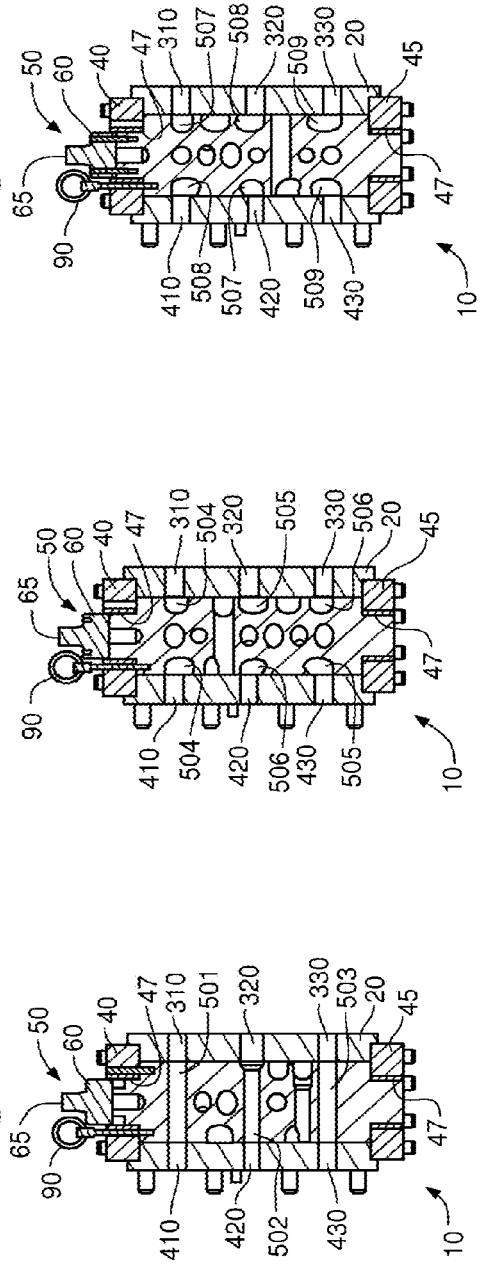

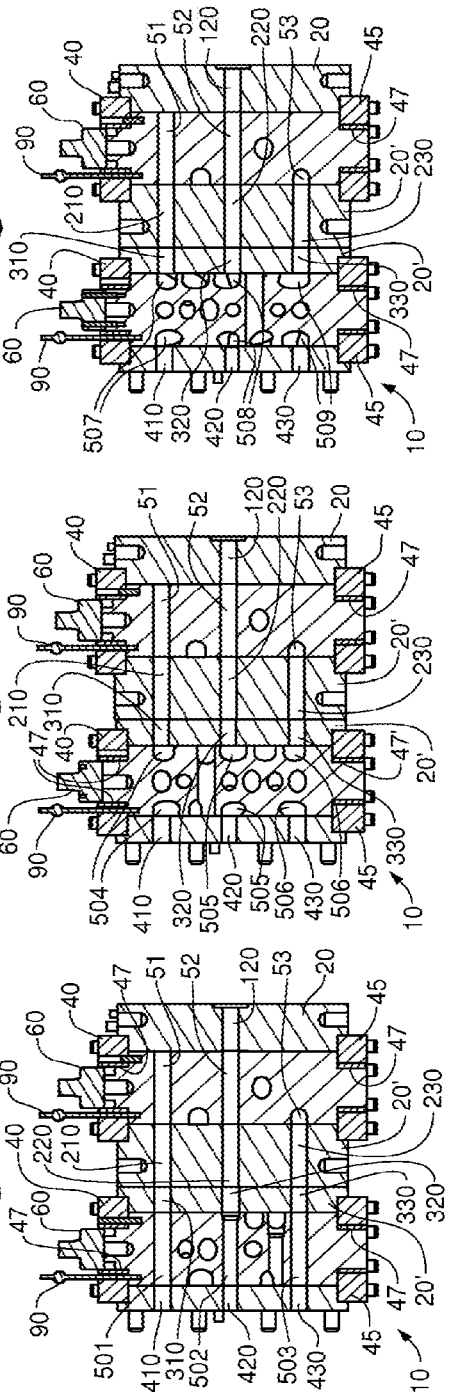

FLOW DIVERTER VALVE FOR AN EXTRUSION SYSTEM

CROSS-REFERENCE TO RELATED APPLICATIONS

The present application is a continuation-in-part of pending U.S. patent application Ser. No. 14/703,069, filed May 4, 2015, the entire disclosure of which is incorporated by reference into the present application.

TECHNICAL FIELD

The present disclosure relates to a flow diverter valve having a monolithic rotating spool to facilitate switching flow paths to an extrusion die.

BACKGROUND

A coextrusion feedblock is used to bring together molten streams of thermoplastic materials from multiple extruders. Individual streams from different extruders are brought together in the coextrusion feedblock to form a particular layer structure. The resulting multi-layer extrudate flow is then delivered to a subsequent extrusion die to produce the desired multiple layer extrudate.

In the case of a coextrusion feedblock adapted for producing 3-layer structures, the feedblock may initially be set-up for producing an A/B/C layer structure. If the operator later wishes to produce an A/C/B layer structure, for example, then with conventional feedblocks, it is first necessary to shut down the line and replace components, such as flow inserts, diverters, plugs, flow spools, and/or selector plates. Significant downtime results from replacing such parts and restringing the line for the new layer structure. This downtime can be on the order of hours.

Recent developments have focused on allowing extrusion die operators to adjust feed blocks from one configuration to another configuration to produce different layered structures, without having to shut down the extruder and/or dissemble the device. U.S. Pat. No. 8,490,643 to Hanson et al. (Hanson) teaches a diverter valve used for a coextrusion feed block that has a body and an axially moveable valve piston in the body. Axial movement of the valve piston from a first position to a second position transitions the flow paths from first flow configuration that produces one type of multi-layered extrudate to a second flow configuration that produces another type of multi-layered structure. Hanson's diverter valve allows the operator to transition between the two-extrudate configurations without having to shut down the extrusion die. The present inventor developed a diverter valve with a monolithic rotating spool. Instead of axially moving a valve piston to alter flow configurations as in Hanson, the spool rotates between two configurations to alter the flow paths and produce different layered structures. U.S. Patent App. Pub. No. 2016/0243743 to Hanson et al. (Hanson II) teaches a two-part rotating cylindrical spool. The two-part spool has a first half with a recess and a second half with another recess. The two-part spool is rotated in sequence, which helps prevent polymer dead head in the diverter valve as the diverter valve transitions between different flow configurations.

SUMMARY

Therefore, there is a need for a flow diverter having a monolithic rotating spool that produces reliable dynamic sealing when adjusted from one configuration to the next to produce different layer structures without having to shut down the extruder(s), disassemble the device, or both.

A flow diverter for an extrusion die configured to form a laminate is disclosed. The flow diverter includes a body having an outer surface, an elongate opening that extends along a first axis, a set of input passages that extend from said outer surface through said body to said elongate opening, and a set of output passages that extend through said body from said elongate opening to said outer surface. The flow diverter also includes an adjustable valve positioned in said elongate opening. The adjustable valve has an outer body fixed to said body, said outer body including a set of channels open to said input passages and said output passages such that material entering said set of input passages travels through said set of channels to said set of output passages. The adjustable valve also has a monolithic spool including a first recess and a second recess opposite to said first recess, wherein said spool is rotatable with respect to said outer body between a first position where said first recess and said second recess align said set of channels with said set of input passages and said set of output passage in a first flow configuration, and a second position where said first recess and said second recess align said set of channels with said set of input passages and said set of output passages in a second flow configuration. The first flow configuration is different from said second flow configuration.

The first and second recesses may be positioned around said spool such that material can pass through said set of channels when said spool transitions from said first position to said second position. The set of input passages can include a first input passage, a second input passage, and a third input passage, the set of output passages can include a first output passage, a second output passage, and a third output passage, the set of channels can include a first channel, a second channel, and a third channel. In the first configuration, said first channel is aligned with said first input passage and said first output passage, said second channel is aligned with said second input passage and said second output passage, and said third channel is aligned with said third input passage and said third output passage. And, in the second configuration, said first channel is aligned with said first input passage and said second output passage, said second channel is aligned with said second input passage and said first output passage, and said third channel is aligned with said third input passage and said third output passage.

The set of input passages can include at least three input passages, wherein said set of output passages can include at least three output passages, wherein said set of channels can include at least three channels. The first recess and said second recess can each extend around said spool about 90°. Each of said first recess and said second recess can be at least partially aligned with at least one input passage and at least one output passage when said spool is in any rotational position about said first axis.

BRIEF DESCRIPTION OF THE DRAWINGS

The foregoing summary, as well as the following detailed description of illustrative embodiments of the present application, will be better understood when read in conjunction with the appended drawings. For purposes of illustrating the present application, there is shown in the drawings illustrative embodiments of the disclosure. It should be understood, however, that the application is not limited to the precise arrangements and instrumentalities shown. In the drawings:

FIG. 2A is a cross-sectional view of the extrusion device of FIG. 1, with an adjustment valve shown in a first configuration such that the extrusion device is configured to produce extrudate having a first layer structure.

FIG. 2B is a left side view of a spool of the adjustment valve of FIG. 2A.

FIG. 2C is a right side view of the spool of the adjustment valve of FIG. 2B.

FIG. 3A is a cross-sectional view of the extrusion device of FIG. 1, with the adjustment valve shown in a second configuration such that the extrusion device is configured to produce extrudate having a second layer structure.

FIG. 3B is a left side view of the spool of the adjustment valve of FIG. 3A.

FIG. 3C is a right side view of the spool of the adjustment valve of FIG. 3A.

FIG. 4A is a perspective view of an extrusion device in accordance with another embodiment of the invention.

FIG. 4B is another perspective view of the extrusion device of FIG. 4A.

FIG. 5A is a cross-sectional view of the extrusion device of FIG. 4A, with an adjustment valve shown in a first configuration such that the extrusion device is configured to produce extrudate having a first layer structure.

FIG. 5B is a front view of a spool of the adjustment valve of FIG. 5A.

FIG. 5C is a rear view of the spool of the adjustment valve of FIG. 5A.

FIG. 6A is a cross-sectional view of the extrusion device of FIG. 4A, with the adjustment valve shown in a second configuration such that the extrusion device is configured to produce extrudate having a second layer structure.

FIG. 6B is a front view of a spool of the adjustment valve of FIG. 6A.

FIG. 6C is a rear view of a spool of the adjustment valve of FIG. 6A.

FIG. 7A is a cross-sectional view of the extrusion device of FIG. 4A, with the adjustment valve shown in a second configuration such that the extrusion device is configured to produce extrudate having a second layer structure.

FIG. 7B is a front view of a spool of the adjustment valve of FIG. 7A.

FIG. 7C is a rear view of a spool of the adjustment valve of FIG. 7A.

FIG. 8D is a cross-sectional view of the extrusion device of FIG. 8A, with an adjustment valve shown in a first configuration such that the extrusion device is configured to produce extrudate having a first layer structure.

FIG. 8E is a cross-sectional view of the extrusion device of FIG. 8A, with an adjustment valve shown in a second configuration such that the extrusion device is configured to produce extrudate having a second layer structure.

FIG. 8F is a cross-sectional view of the extrusion device of FIG. 8A, with an adjustment valve shown in a third configuration such that the extrusion device is configured to produce extrudate having a third layer structure.

FIG. 8G is a cross-sectional view of the extrusion device of FIG. 8A, with an adjustment valve shown in a fourth configuration such that the extrusion device is configured to produce extrudate having a fourth layer structure.

FIG. 8H is a cross-sectional view of the extrusion device of FIG. 8A, with an adjustment valve shown in a fifth configuration such that the extrusion device is configured to produce extrudate having a fifth layer structure.

FIG. 8I is a cross-sectional view of the extrusion device of FIG. 8A, with an adjustment valve shown in a sixth configuration such that the extrusion device is configured to produce extrudate having a sixth layer structure.

DETAILED DESCRIPTION OF ILLUSTRATIVE EMBODIMENTS

An extrusion device 10 is adjustable between first and second output configurations. The extrusion device 10, when in the first output configuration, produces extrudate having a first layer arrangement, and when in the second output configuration, produces extrudate having a second layer arrangement. In some cases, the extrusion device 10 has only two output configurations (or "settings"). Reference is made to the embodiment of FIGS. 1A-3C. In other cases, the extrusion device 10 has three or more output configurations, each adapted to produce a unique extrudate layer arrangement. Reference is made to the embodiment of FIGS. 4A-7C. Depending upon the number of different layer arrangements the extrusion device is intended to produce, it can have six or more output configurations. FIGS. 8A-8I and FIGS. 9-10 respectfully depict two embodiments wherein the extrusion device 10 has six different output configurations. Thus, it is capable of producing six different extrudate layer arrangements. Depending upon the range of layer arrangements desired, the extrusion device can have more than six output configurations.

In the embodiments illustrated, the output configuration of the extrusion device 10 can be changed without having to shut down the extrusion line. For example, one or more extruders delivering multiple polymer flows to the extrusion device 10 can continue operating while the layer arrangement produced by the device is changed. The extrusion device 10 can optionally be adjustable (e.g., from being configured to produce extrudate having a first layer arrangement to being configured to produce extrude having a second layer arrangement) without having to remove any component and replace it with a different component. More generally, the extrusion device 10 can optionally be adjustable between different output configurations without having to disassemble any portion of the extrusion device.

The extrusion device 10 can be a coextrusion feedblock, a flow arranger located upstream of a feedblock, or any other device in which it would be desirable to change the arrangement of layers output from the device.

Figure 1A:
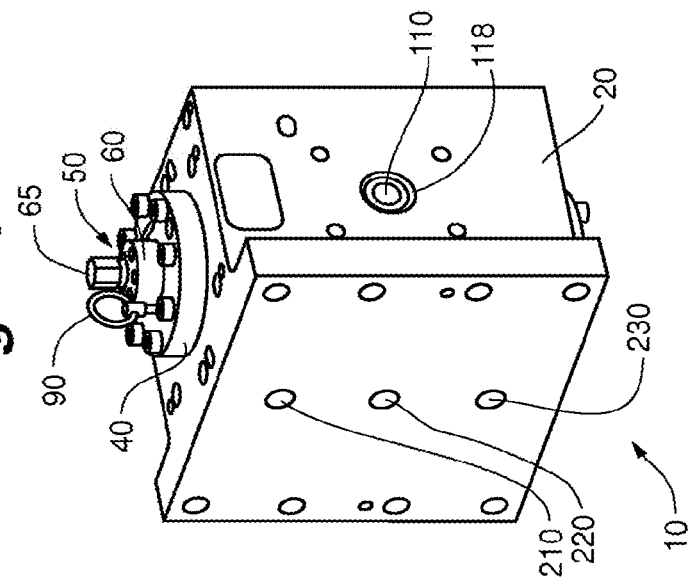
FIG. 1A is a perspective view of an extrusion device in accordance with one embodiment of the present invention.
Figure 1B:
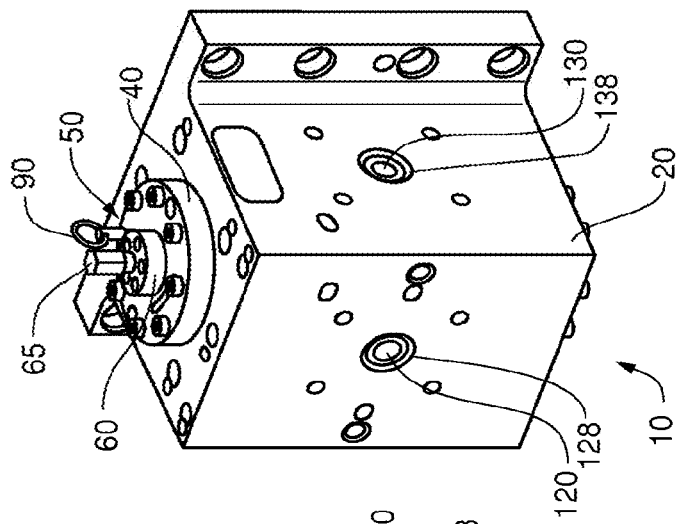
FIG. 1B is another perspective view of the extrusion device of FIG. 1.
Figure 1C:
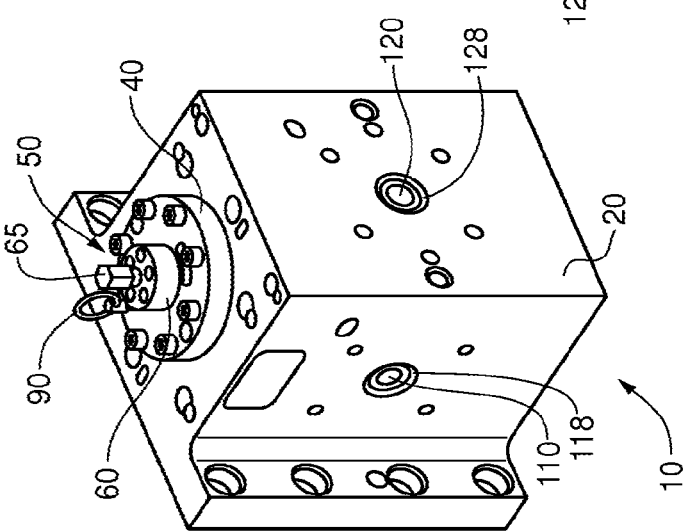
FIG. 1C is a still another perspective of the extrusion device of FIG. 1.
Figure 8A:
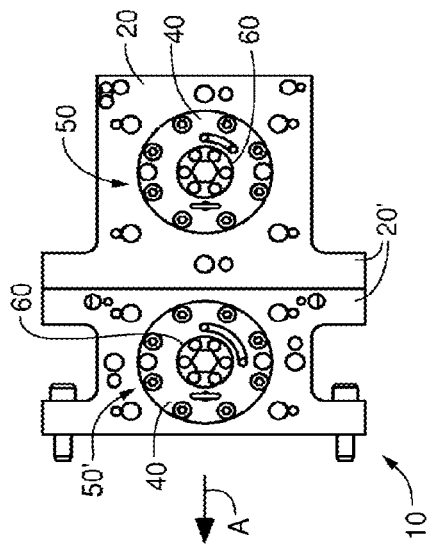
FIG. 8A is a top view of an extrusion device in accordance with still another embodiment of the invention.
Figure 8C:
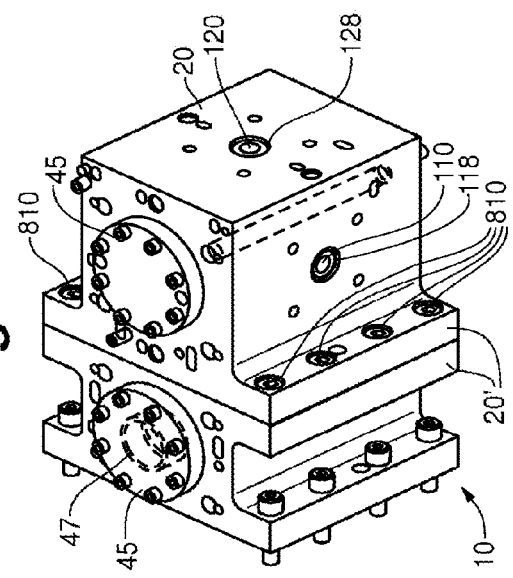
FIG. 8C is another perspective view of the extrusion device of FIG. 8A.
Figure 8B:
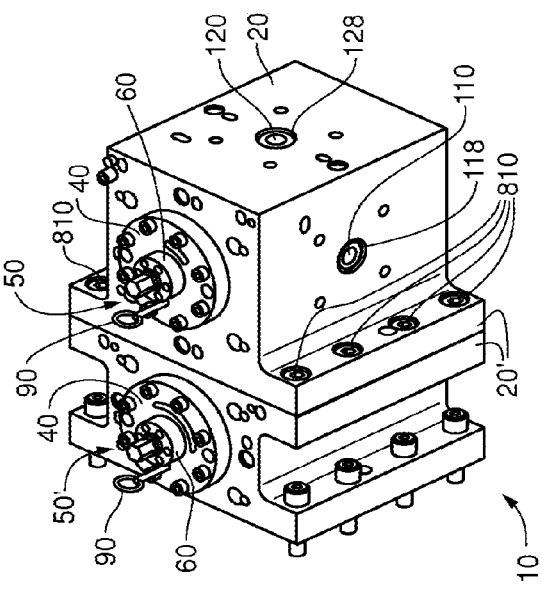
FIG. 8B is a perspective view of the extrusion device of FIG. 8A.
Figure 9:
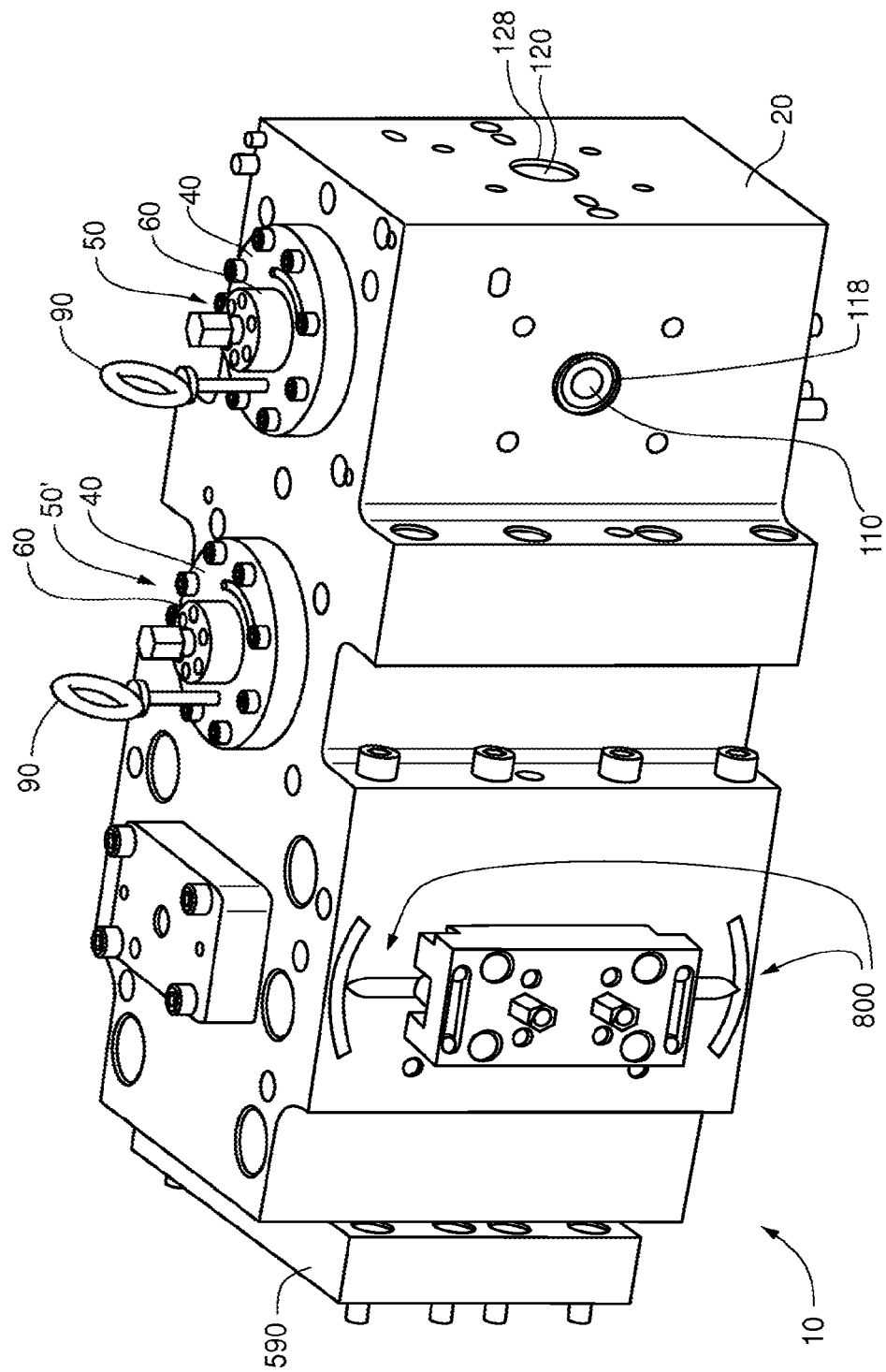
FIG. 9 is a perspective view of an extrusion device in accordance with yet another embodiment of the invention.
Figure 10:
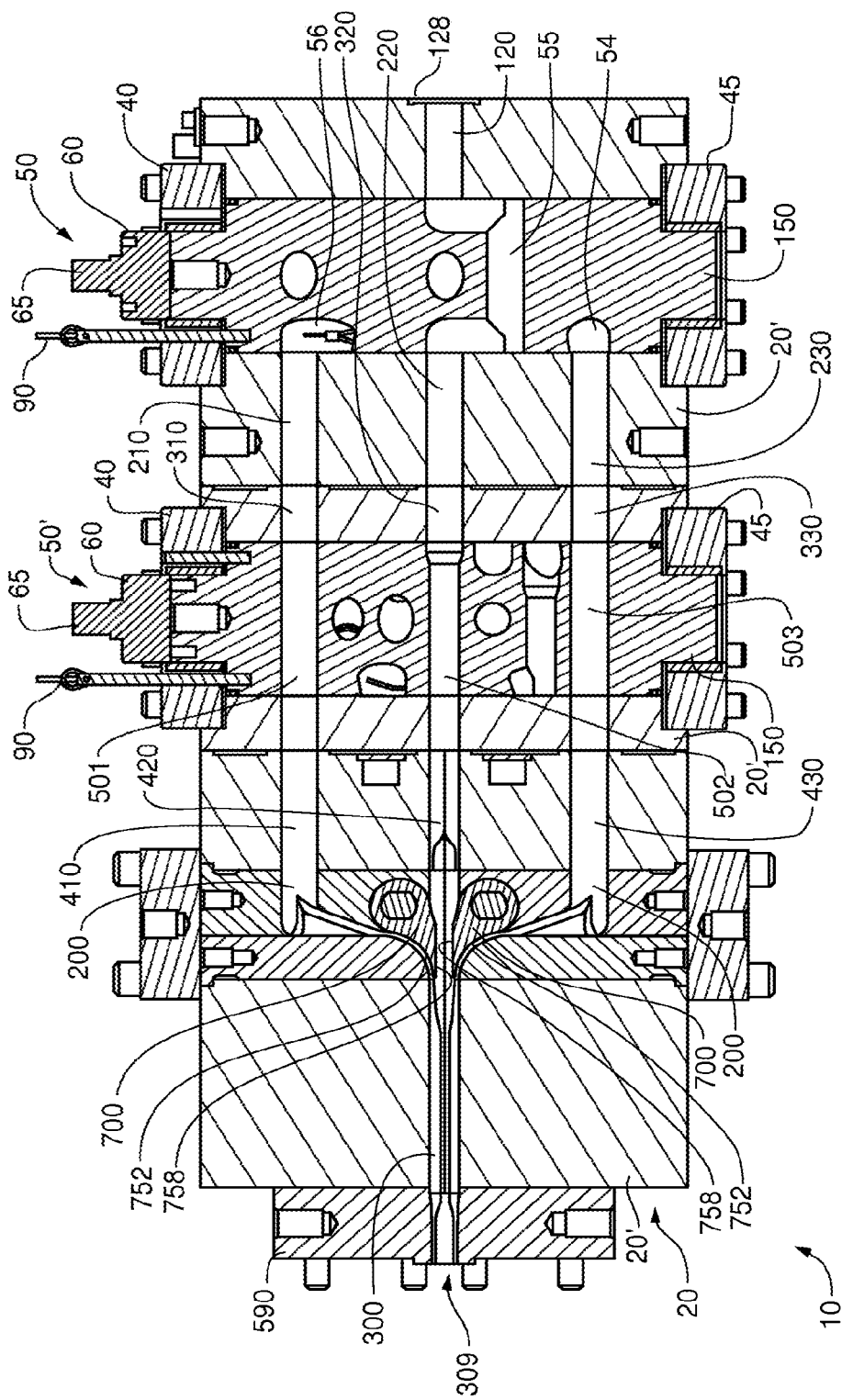
FIG. 10 is a cross-sectional view of the extrusion device of FIG. 9.
Figure 11:
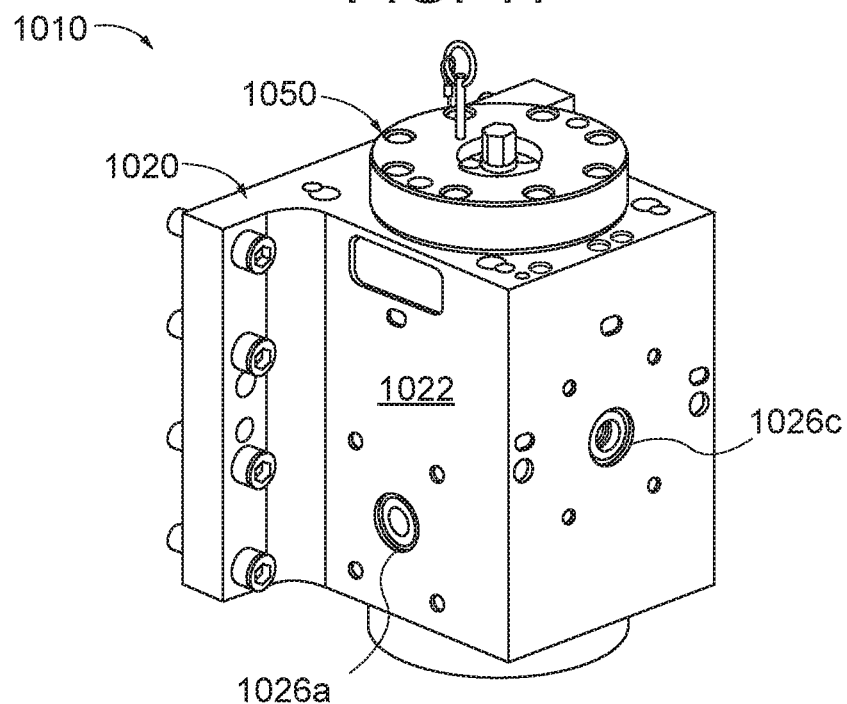
FIGS. 11 and 12 are top perspective views of a flow diverter for an extrusion die system according to an embodiment of the present disclosure.
Figure 12:
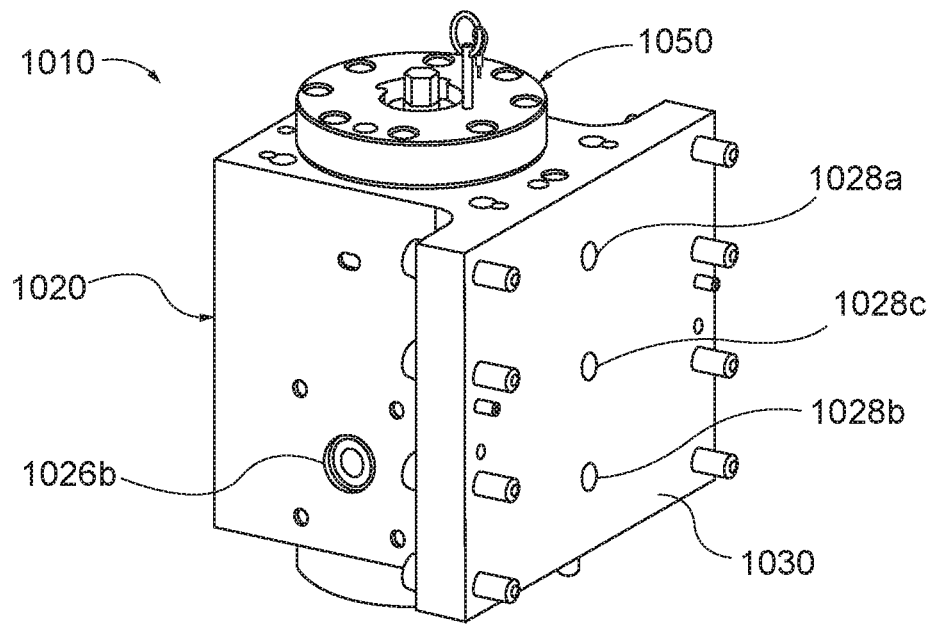
Figure 13:
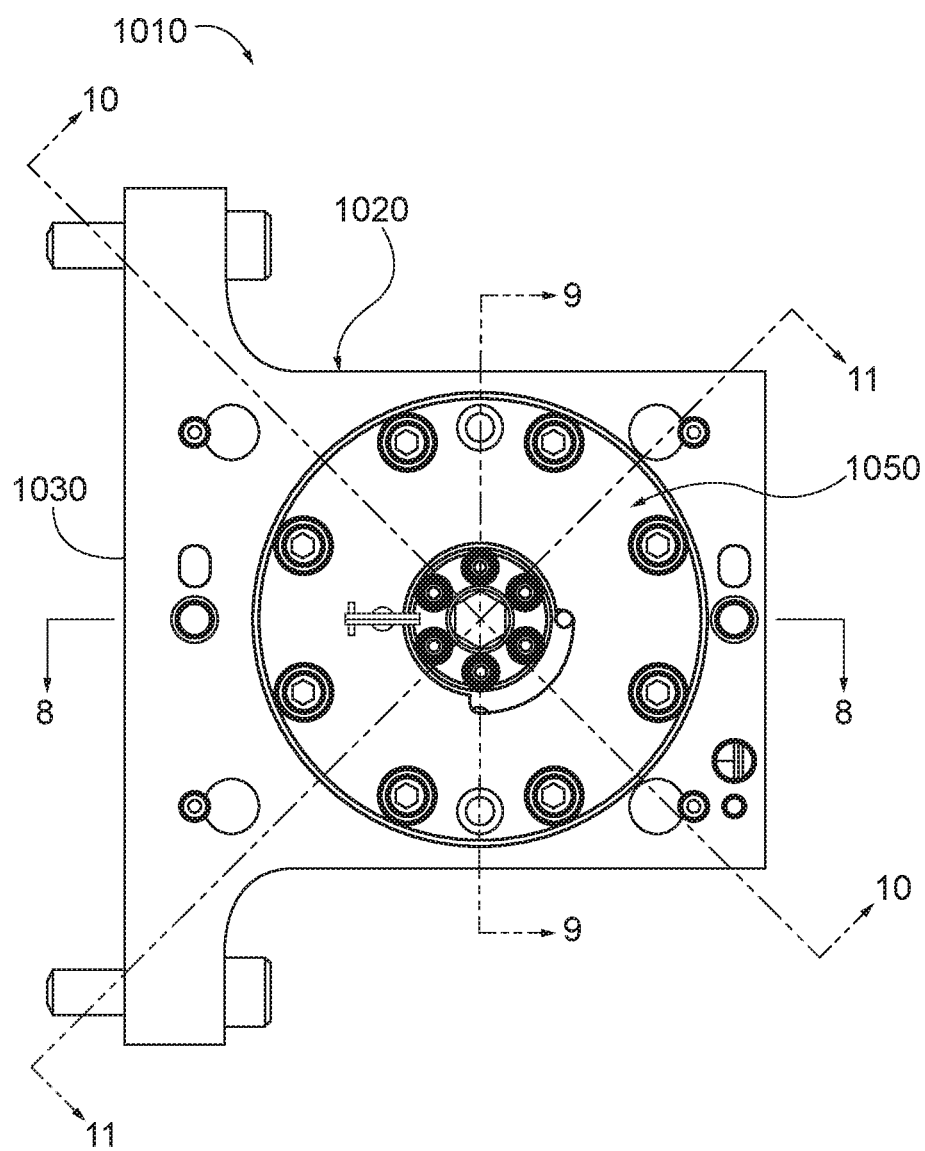
FIG. 13 is a top plan view of the flow diverter shown in FIGS. 11 and 12.

The extrusion device 10 has a body 20 and an adjustment valve 50. The body 20 can be provided in different shapes and forms. In FIGS. 1A-1C and 4A-4B, the body 20 is a single block. The same is true of the body 20 in FIGS. 4A and 4B. The body 20 can alternatively comprise multiple blocks. For example, the body 20 of the extrusion device 10 shown in FIGS. 8A-8I comprises two blocks 20', 20'. In FIGS. 9 and 10, the body 20 of the extrusion device 10 comprises three blocks 20', 20', 20', as is best seen in FIG. 10. As shown in FIGS. 8B and 8C, the blocks can be joined together by a plurality of fasteners (e.g., bolts) 810.

The body 20 has first 118 and second 128 inputs adapted to respectively receive first and second polymer flows from first and second extruders. The adjustment valve 50 can be rotated between first and second operative positions while the first and second extruders continue delivering first and second polymer flows to the first 118 and second 128 inputs of the body 20. Thus, the output can be changed without having to turn off the extruders. In the embodiments illustrated, the body 20 has first 118, second 128, and third 138 inputs adapted to respectively receive first, second, and third polymer flows (e.g., from first, second, and third extruders). If desired, the body 20 can be provided with inputs to receive polymer flows from four or five, or even more, extruders.

It is to be appreciated that the inputs can be provided at various different locations on the body 20 of the extrusion device 10. Moreover, a single inlet can alternatively be provided to supply polymer to one or more flow lines of the extrusion device.

Thus, the extrusion device 10 has a body 20 and an adjustment valve 50, which is rotatable between first and second operative positions. The rotational adjustment system of the present extrusion device 10 provides exceptional dynamic sealing. It also enables a particularly compact device profile.

When the adjustment valve 50 is in the first operative position, the extrusion device 10 is configured to produce extrudate having a first layer arrangement. When the adjustment valve 50 is in the second operative position, the extrusion device 10 is configured to produce extrudate having a second layer arrangement. The first and second layer arrangements are different. For example, the first layer arrangement can be an "AB" layer arrangement, while the second layer arrangement is a "BA" layer arrangement. In the present disclosure, "A" refers to a layer formed by a first polymer flow (e.g., from a first extruder), while "B" refers to a layer formed by a second polymer flow (e.g., from a second extruder). Layer A will commonly have a different composition than layer B. For example, layers A and B may be formed of different polymers. In some cases, layer A will be one color while layer B is another color.

Referring to the embodiments of FIGS. 1A-3C and 4A-7C, the body 20 of the extrusion device 10 has a plurality of intake conduits 110, 120, 130 or 310, 320, 330 and a plurality of output conduits 210, 220, 230 or 410, 420, 430. In the embodiments illustrated, the body 20 has the same number "n" of (e.g., two or more, optionally three) intake conduits and output conduits, and the adjustment valve has the same number "n" of (not more) active extrudate channels. Thus, at any given time during operation, there can be "n" active extrudate channels in the adjustment valve, and at least "n" (optionally at least "2n") closed extrudate channels in the adjustment valve. The active extrudate channels are open to the respective intake conduits of the body 20, while the closed extrudate channels are blocked off at both ends by confronting interior surfaces of the body (such that during operation, no extrudate can be flowed through the closed extrudate channels).

The adjustment valve 50 has first and second sets of extrudate channels 51, 52, 53 and 54, 55, 56 or 501, 502, 503 and 504, 505, 506. When the adjustment valve 50 is in the first operative position, the first set of extrudate channels 51, 52, 53 or 501, 502, 503 is open to the intake conduits and to the output conduits, while the second set of extrudate channels 54, 55, 56 or 504, 505, 506 is closed off from the intake conduits and from the output conduits. When the adjustment valve 50 is in the second operative position, the second set of extrudate channels 54, 55, 56 or 504, 505, 506 is open to the intake conduits and to the output conduits, while the first set of extrudate channels 51, 52, 53 or 501, 502, 503 is closed off from the intake conduits and from the output conduits.

In the embodiments illustrated, the adjustment valve 50 comprises a spool 150 and a lock 90. The spool 150 is rotatable and is shown having a cylindrical or generally cylindrical configuration. Reference is made to FIGS. 2B, 2C, 3B, 3C, 5B, 5C, 6B, 6C, 7B, and 7C. The body 20 of the illustrated extrusion device 10 has a generally cylindrical opening in which the spool 150 is mounted. The illustrated spool 150 is mounted in the body 20 of extrusion device such that the spool has no freedom (or substantially no freedom) to move axially (i.e., up or down as shown in FIGS. 2A-3C) relative to the body 20 of the extrusion device. Thus, movement of the illustrated adjustment valve involves rotation of the spool, but no axial movement of the spool. In the embodiments illustrated, this is accomplished by mounting the spool between two caps 40, 45 anchored to the body 20 of the extrusion device 10. Alternatively, the spool can be mounted between a cap (such as cap 40) and an inwardly turned shoulder of the body 20 itself.

The illustrated lock 90 has a locked configuration and an unlocked configuration. The spool 150 is rotatable relative to the body 20 when the lock 90 is in the unlocked configuration. In contrast, the spool 150 is locked against rotation relative to the body 20 when the lock is in the locked position. The lock 90 can be, for example, a quick release pin. This is perhaps best shown in FIGS. 1A-1C, 2A, 3A, 4A, 4B, 5A, 6A, 7A, 8A, and 9. In these embodiments, to adjust the extrusion device from one output configuration to another, an operator can simply pull the quick release pin, rotate the adjustment valve to the desired operative position, and re-engage the quick release pin, thereby locking the adjustment valve against rotation relative to the body.

If so desired, the body 20 may have a cylindrical opening in which the spool is mounted, and the body may be devoid of flushing channels (e.g., of the type that extend parallel to the axis of that cylindrical opening).

The adjustment valve 50 is adapted to rotate in increments when moving from one operative position to the next. Thus, the adjustment valve 50 has a plurality of different operative positions such that each two adjacent operative positions are separated by an angular increment. If desired, each two adjacent operative positions can be separated by the same angular increment (e.g., 45 degrees). This, however, is by no means required.

In the embodiments illustrated, the adjustment valve 50 comprises a spool 150 with a generally cylindrical configuration. The spool 150 is mounted in a generally cylindrical opening of the body 20. The spool 150 has a body portion 157, which has the extrudate channels. The illustrated spool 150 has opposed first 155 and second 159 neck portions, which define opposite ends of the spool. The body portion 157, the first neck portion 155, and the second neck portion 159 preferably each have a cylindrical or generally cylindrical configuration. The two neck portions 155, 159 project from the body portion 157 and each has a smaller diameter than the body portion.

The illustrated spool 150 is mounted in a cylindrical or generally cylindrical opening of the body 20 between two caps 40, 45. The caps 40, 45 are fastened (e.g., bolted) to the body 20. A bushing 47 can optionally be provided between each cap 40, 45 and the spool 150. In the embodiments illustrated, a bushing 47 is provided on each neck portion 155, 159 of the spool 150. A trunnion 60 is fastened (e.g., bolted) to the first neck portion 155 of the spool. The illustrated trunnion 60 has a hex cap 65, which an operator can conveniently rotate using a socket, a wrench, etc.

Thus, the illustrated spool configuration has a body portion 157 and two reduced-diameter neck portions 155, 159. Each end of the body portion 157 defines a shoulder with an annular surface 158. The annular surface 158 adjacent the first neck portion 155 can have a series of openings spaced apart along a circumference of the surface. The quick release pin can be engaged selectively with any one of these openings in order to lock the spool in a desired operative position. This is perhaps best shown in FIGS. 2A, 3A, 5A, 6A, 7A, and 8D-8I. Each of these openings corresponds to a different operative position of the adjustment valve 50. Thus, as noted above, the quick release pin can be pulled out of the spool 150, thereby freeing the spool to rotate relative to the body 20. An operator can then use a socket or another suitable tool to grip the hex cap 65 on the trunnion 60 and rotate the spool 150 until the desired opening in the adjacent annular shoulder surface 158 is aligned with the pin, at which point the pin can be inserted into that opening, thereby locking the spool 150 in the desired operative position.

The spool can alternatively be configured such that there is only one neck portion (e.g., the first neck portion 155), rather than two as shown. Another option is to eliminate both neck portions 155, 159, such that the spool 150 consists of the body portion 157 and is a right circular cylinder. If so desired, the or each spool in any embodiment hereof can be devoid of (i.e., such that the spool does not house) a cartridge heater.

Each spool 150 has a plurality of extrudate channels. While the number of extrudate channels in the spool 150 will vary from embodiment to embodiment, there will typically be at least four, in many cases at least six, and in some cases at least nine, extrudate channels in the spool 150. In FIGS. 2A-3C, the spool 150 has six extrudate channels 51-56. In FIGS. 5A-7C, the spool 150 has nine extrudate channels 501-509. The particular number of extrudate channels will vary based upon the requirements of different systems. In the embodiments illustrated, each spool has at least three openings (e.g., inlets) for passage of extruded material into the spool and at least three outlets for passage of extruded material out of the spool.

The body portion 157 of each illustrated spool 150 has at least one channel that extends radially in straight line across an entire diameter of the body portion. In the embodiments illustrated, the body portion 157 of each spool 150 has at least two such diametrical through-channels. Reference is made to channels 51 and 52 in FIGS. 2A-2C, channel 55 in FIGS. 3A-3C, and channels 501, 502, and 503 in FIGS. 5A-5C. In addition to having one or more diametrical through-channels, the body portion 157 can advantageously have at least one arcuate channel, i.e., a channel extending along a curved path. Each of the spools 150 shown in FIGS. 2A-3C, 5A-7C, and 8D-8I has a body portion 157 with a plurality of arcuate channels. One or more (optionally each) of these channels may be open through an outer surface of the body portion 157 (e.g., through a cylinder surface thereof) along a desired length of the channel. In some cases, a channel of this nature is open through the outer surface of the body portion along the entire length of the channel. Reference is made to channels 53, 54, and 56 in FIGS. 2A-3C, and channels 504 and 509 in FIGS. 6A-7C. In other cases, a curved channel has a total length that includes a first length and a second length, where the channel is open through the outer surface of the body portion along the first length, while the second length of the channel extends radially through the body portion 157 of the spool 150. Reference is made to channel 51 in FIGS. 2A-3C, and channels 505, 506, 507, and 508 in FIGS. 5A-7C. In some cases, a radially extending length of a channel extends between two curved lengths of the channel. Reference is made to channels 505, 506, 507, and 508 in FIGS. 5A-7C. Furthermore, the spool 150 can optionally include at least one channel having a first length extending straight across the diameter of the body portion 157 and one or two lengths that each extend axially in a straight line. Reference is made to channel 55 in FIGS. 3A-3C.

Thus, the body portion 157 of the spool 150 can have a plurality of diametrical through-channels as well as a plurality of curved channels, which can optionally be open along an outer surface of the body portion (e.g., through a cylinder surface thereof).

In the embodiments illustrated, each extrudate channel extends between an entrance port 51*a*, 52*a*, 53*a*, 54*a*, 55*a*, 56*a*, 501*a*, 502*a*, 503*a*, 504*a*, 505*a*, 506*a*, 507*a*, 508*a*, 509*a*, which receives a flow of polymer into the spool 150, and an exit port 51*b*, 52*b*, 53*b*, 54*b*, 55*b*, 56*b*, 501*b*, 502*b*, 503*b*, 504*b*, 505*b*, 506*b*, 507*b*, 508*b*, 509*b*, from which the same flow of polymer exits the spool. Thus, when a desired extrudate channel is in an active position (i.e., when it is positioned to receive extrudate flow), a flow path extends from an intake conduit of the body 20, through the desired extrudate channel in the spool 150, and into an output conduit of the body 20.

Referring to FIGS. 1C, 2A, 3A, 4B, 5A, 6A, 7A, 8A, and 8D-8I, the illustrated extrusion device 10 has three output conduits 210, 220, 230 or 410, 420, 430 passing through the body 20 generally parallel to a machine direction (see arrow A in FIG. 8A) of the extrusion device. These output conduits are configured to deliver extrudate out of the extrusion device 10. The adjustment valve 50 is rotatable, relative to the body 20, about a rotation axis perpendicular to the machine direction A of the illustrated extrusion device 10.

Thus, the illustrated extrusion device 10 has three flow lines each extending through the body 20 and through the adjustment valve 50. The body 20 and the adjustment valve 50 preferably are configured such that, during rotation of the adjustment valve 50 from the first operative position to the second operative position, all three of the flow lines always remain open. In other embodiments, the extrusion device has only two flow lines. When the adjustment valve rotates from one operative position to another, the path (or "route") of each flow line changes, and a slight pressure increase may occur, but the flow lines will never be closed entirely.

Referring now to the embodiment of FIGS. 2A-3C, the body 20 of the extrusion device 10 has first 110, second 120, and third 130 intake conduits as well as first 210, second 220, and third 230 output conduits. The adjustment valve 50 has first 51, second 52, third 53, fourth 54, fifth 55, and sixth 56 extrudate channels. When the adjustment valve 50 is in the first operative position, the first intake conduit 110 is in fluid communication with the first extrudate channel 51 and the first output conduit 210, while the second intake conduit 120 is in fluid communication with the second extrudate channel 52 and the second output conduit 220, and while the third intake conduit 130 is in fluid communication with the third extrudate channel 53 and the third output conduit 230. When the adjustment valve 50 is in the second operative position, the first intake conduit 110 is in fluid communication with the fourth extrudate channel 54 and the third output conduit 230, while the second intake conduit 120 is in fluid communication with the fourth extrudate channel 55 and the second output conduit 220, and while the third intake conduit 130 is in fluid communication with the sixth extrudate channel 56 and the first output conduit 210.

With continued reference to the embodiment of FIGS. 2A-3C, the body 20 and the adjustment valve 50 are configured such that at all times during rotation of the adjustment valve between the first and second operative positions: (i) the first intake conduit 110 is in fluid communication with the first extrudate channel 51, the fourth extrudate channel 54, or both, (ii) the second intake conduit 120 is in fluid communication with the second extrudate channel 52, the fifth extrudate channel (55), or both, and (iii) the third intake conduit 130 is in fluid communication with the third extrudate channel 53, the sixth extrudate channel 56, or both. Preferably, during rotation of the adjustment valve 50 from the first operative position to the second operative position: (a) the first intake conduit 110 is initially open only to the first extrudate channel 51, then is open to both the first extrudate channel 51 and the fourth extrudate channel 54, and finally is open only to the fourth extrudate channel 54, (b) the second intake conduit 120 is initially open only to the second extrudate channel 52, then is open to both the second extrudate channel 52 and the fifth extrudate channel 55, and finally is open only to the fifth extrudate channel 55, and (c) the third intake conduit 130 is initially open only to the third extrudate channel 53, then is open to both the third extrudate channel 53 and the sixth extrudate channel 56, and finally is open only to the sixth extrudate channel 56.

In the embodiment of FIGS. 5A-7C, the adjustment valve 50 is rotatable between first, second, and third operative positions. Thus, the extrusion device 10 in this embodiment is configured to produce: a first layer arrangement when the adjustment valve 50 is in a first operative position, a second layer arrangement when the adjustment valve 50 is in the second operative position, and a third layer arrangement when the adjustment valve 50 is in the third operative position. The first, second, and third layer arrangements are different. In one example, the first layer arrangement is a 1/2/3 layer arrangement, while the second layer arrangement is a 1/3/2 layer arrangement, and the third layer arrangement is a 2/1/3 layer arrangement. In another example, the first layer arrangement is a 1/2/1 layer arrangement, while the second layer arrangement is a 1/1/2 layer arrangement, and the third layer arrangement is a 2/1/1 layer arrangement.

With continued reference to FIGS. 5A-7C, the body 20 of the extrusion device 10 has a plurality of intake conduits 310, 320, 330 and a plurality of output conduits 410, 420, 430. The adjustment valve 50 has first, second, and third sets of extrudate channels 501, 502, 503 and 504, 505, 506 and 507, 508, 509. When the adjustment valve 50 is in the first operative position, the first set of extrudate channels 501, 502, 503 is open to the intake conduits 310, 320, 330 and to the output conduits 410, 420, 430, while the second and third sets of extrudate channels 504, 505, 506 and 507, 508, 509 are closed off from the intake conduits and from the output conduits. When the adjustment valve 50 is in the second operative position, the second set of extrudate channels 504, 505, 506 is open to the intake conduits 310, 320, 330 and to the output conduits 410, 420, 430, while the first and third sets of extrudate channels 501, 502, 503 and 507, 508, 509 are closed off from the intake conduits and from the output conduits. When the adjustment valve 50 is in the third operative position, the third set of extrudate channels 507, 508, 509 is open to the intake conduits 310, 320, 330 and to the output conduits 410, 420, 430, while the first and second sets of extrudate channels 501, 502, 503 and 504, 505, 506 are closed off from the intake conduits and from the output conduits.

In FIGS. 5A-7C, the body 20 of the extrusion device 10 has first 310, second 320, and third 330 intake conduits as well as first 410, second 420, and third 430 output conduits. In this embodiment, the adjustment valve 50 has first 501, second 502, third 503, fourth 504, fifth 505, sixth 506, seventh 507, eighth 508, and ninth 509 extrudate channels. When the adjustment valve 50 is in the first operative position, the first intake conduit 310 is in fluid communication with the first extrudate channel 501 and the first output conduit 410, while the second intake conduit 320 is in fluid communication with the second extrudate channel 502 and the second output conduit 420, and while the third intake conduit 330 is in fluid communication with the third extrudate channel 503 and the third output conduit 430. When the adjustment valve 50 is in the second operative position, the first intake conduit 310 is in fluid communication with the fourth extrudate channel 504 and the first output conduit 410, while the second intake conduit 320 is in fluid communication with the fifth extrudate channel 505 and the third output conduit 430, and while the third intake conduit 330 is in fluid communication with the sixth extrudate channel 506 and the second output conduit 420. When the adjustment valve 50 is in the third operative position, the first intake conduit 310 is in fluid communication with the seventh extrudate channel 507 and the second output conduit 420, while the second intake conduit 320 is in fluid communication with the eighth extrudate channel 508 and the first output conduit 410, and while the third intake conduit 330 is in fluid communication with the ninth extrudate channel 509 and the third output conduit 430.

In the two embodiments shown respectfully in FIGS. 8A-8I and FIGS. 9-10, the extrusion device 10 further includes a second adjustment valve 50'. In these embodiments, the second adjustment valve 50' is rotatable between first, second, and third operative positions. The two adjustment valves 50, 50' can comprise two spools each optionally being cylindrical or generally cylindrical and configured such that their two respective cylinder axes are parallel to each other. The second adjustment valve is downstream of the first adjustment valve. The extrusion device 10 is configured to produce different layer arrangements when the second adjustment valve 50' is in the first operative position than when the second adjustment valve is in the second or third operative position. The second adjustment valve 50' can be of the nature described above relative to the first adjustment valve 50. In FIGS. 8A-10, the extrusion device 10 has three flow lines, each extending through the body 20 and through both of the adjustment valves 50, 50'. In the present embodiments, the extrusion device 10 has six different output configurations (or "settings"), each characterized by a unique combination of the first adjustment valve 50 being in the first or second position while the second adjustment valve 50' is in the first, second, or third position. Thus, the extrusion device 10 is adapted to produce six different layer arrangements.

For purposes of illustration, the adjustment valve/spool design from FIGS. 1A-3C is used for the first adjustment valve 50 in the embodiment of FIGS. 8A-8I, and the adjustment valve/spool design from FIGS. 4A-7C is used for the second adjustment valve 50' in the embodiment of FIGS. 8A-8I. It is to be appreciated, however, that for other embodiments involving two or more adjustment valves, many other valve/spool designs can be used.

FIG. 8D shows the extrusion device 10 in a first output configuration (or "first setting"). When the extrusion device 10 is in this output configuration, the resulting layer arrangement can be an A/B/C layer structure. Thus, the first spool 150 is shown in an "ABC" operative position, while the second spool 150 is shown in a "123" operative position.

FIG. 8E shows the extrusion device 10 in a second output configuration (or "second setting"). When the extrusion device 10 is in this output configuration, the resulting layer arrangement can be a B/A/C layer structure. Thus, the first spool 150 is shown in an "ABC" operative position, while the second spool 150 is shown in a "132" operative position.

FIG. 8F shows the extrusion device 10 in a third output configuration (or "third setting"). When the extrusion device 10 is in this output configuration, the resulting layer arrangement can be a B/A/C layer structure. Thus, the first spool 150 is shown in an "ABC" operative position, while the second spool 150 is shown in a "213" operative position.

FIG. 8G shows the extrusion device 10 in a fourth output configuration (or "fourth setting"). When the extrusion device 10 is in this output configuration, the resulting layer arrangement can be a C/B/A layer structure. Thus, the first spool 150 is shown in a "CBA" operative position, while the second spool 150 is shown in a "123" operative position.

FIG. 8H shows the extrusion device 10 in a fifth output configuration (or "fifth setting"). When the extrusion device 10 is in this output configuration, the resulting layer arrangement can be a C/A/B layer structure. Thus, the first spool 150 is shown in a "CBA" operative position, while the second spool 150 is shown in a "132" operative position.

FIG. 8I shows the extrusion device 10 in a sixth output configuration (or "sixth setting"). When the extrusion device 10 is in this output configuration, the resulting layer arrangement can be a B/C/A layer structure. Thus, the first spool 150 is shown in a "CBA" operative position, while the second spool 150 is shown in a "213" operative position.

In the embodiment of FIGS. 9 and 10, the extrusion device 10 is a coextrusion feedblock. This can be the case in any embodiment of the present disclosure. Thus, downstream from the adjustment valve(s), the extrusion device 10 can have a flow-combining region where multiple flow lines passing through the extrusion device converge and are joined to form a single outflow conduit 300. In the illustrated embodiment, the feedblock has a single central outflow conduit 300 and two coextrusion conduits 200. The two coextrusion conduits 200 converge with each other and ultimately intersect with the outflow conduit 300.

The configuration of the outflow conduit 300 can be varied to suit different applications. In FIGS. 9 and 10, a single central outflow conduit 300 extends along a straight path located in the middle of the feedblock. This, however, is not required. For example, the central outflow conduit need not be located at the middle of the feedblock. Instead, it may be closer to the top or bottom of the feedblock. The central outflow conduit may be curved or angled, although it will generally be desirable to minimize the flow resistance in the conduit. Moreover, in some cases, layers from one or more coextrusion conduits 200 are applied to one side, but not both sides, of the core layer delivered from the central outflow conduit. In such cases, one or more coextrusion conduits are located on one side of the central outflow conduit 300, but not on the other side.

In FIGS. 9 and 10, the feedblock has a single outflow conduit 300 and two coextrusion conduits 200. A feedblock of this nature will commonly be used to produce a 3-layer coextrusion structure. Skilled artisans will appreciate, however, that a single or double-layer coextrusion structure can be produced with such a feedblock. This can be done, for example, by not using and closing one or both of the coextrusion conduits 200. More generally, the number and arrangement of coextrusion conduits 200 can be varied to accommodate many different applications. The feedblock, for example, can alternatively have a single coextrusion conduit. As another example, when a 5-layer coextrusion structure is desired, the feedblock will typically have at least four coextrusion conduits. Many other variants of this nature will be apparent to skilled artisans given the present teaching as a guide.

In FIGS. 9 and 10, each coextrusion conduit 200 opens into the outflow conduit 300, such that the secondary extrudate flow in each coextrusion conduit merges with the extrudate flow in the outflow conduit, thus producing a multi-layer extrudate flow. The layer delivered from the central flow is referred to as the core layer. One or more layers from the coextrusion conduit(s) are layered onto the core layer. The resulting multi-layer extrudate flow moves along the outflow conduit 300 until reaching the outlet 309. From the outlet 309, the multi-layer extrudate flow may be delivered to an extrusion die or another downstream tool, such as a layer multiplier or another feedblock.

The body 20 of the feedblock shown in FIGS. 9 and 10 can optionally comprise four blocks 20' joined together. The illustrated central outflow conduit 300, for example, can extend along a path located at an interface of two such blocks 20', which collectively surround, and are each exposed to, the central conduit. In other cases, two such blocks can be replaced by a single block defining both halves of this portion of the feedblock. The illustrated feedblock also has an output plate 590, although this is not required.

The feedblock shown in FIGS. 9 and 10 has two flow adjusters 700. In other embodiments, there may be only one flow adjuster, four or more flow adjusters, or none. When provided, each flow adjuster 700 preferably is rotatable and wedge shaped. Each flow adjuster 700 may be rotatable about a rotation axis that is perpendicular or generally perpendicular to the rotation axis/axes of the/each adjustment valve 50, 50'. In the illustrated embodiment, each flow adjuster 700 is rotatable to simultaneously change: i) the gap height of the adjacent coextrusion conduit 200, and ii) a height of the central outflow conduit 300. Thus, the flow adjuster(s) 700 is/are downstream from the adjustment valve(s) 50, 50'.

The illustrated flow adjusters 700 each have first and second flow-contacting surfaces. The first flow-contacting surface 758 is exposed to the central outflow conduit 300, and the second flow-contacting surface 752 is exposed to the coextrusion conduit 200. The second flow-contacting surface 752 preferably has a concave configuration.

Each illustrated flow adjuster 700 has a cylindrical base region from which projects a wedge region that narrows with increasing distance from the cylindrical base region until reaching a tip where the extrudate flows from the central outflow conduit 300 and the respective coextrusion conduit 200 intersect. This is shown in FIG. 10, which illustrates a flow-combining region of the feedblock where two coextrusion conduits 200 merge with the central outflow conduit 300. Each coextrusion conduit 200 has an outlet that opens into the central outflow conduit 300. Thus, the illustrated feedblock 500 has a flow-combining region where multiple extrudate flows are combined to form a multi-layer extrudate flow. In FIG. 10, the height of the central outflow conduit 300 at a location entering the flow-combining region is set by the separation distance between the confronting pair of adjustable flow adjusters 700.

In the embodiment of FIG. 10, the feedblock has gauges 800 that indicate the position of the respective adjustable wedge-shaped flow controller 700. The illustrated gauges are merely exemplary; various different gauge types can be used. Moreover, the gauges are optional and may be omitted in some cases.

Thus, the feedblock shown in FIGS. 9 and 10 has two coextrusion conduits 200 and two flow adjusters 700. The configuration, functionality, and other features of these coextrusion conduits 200 and flow adjusters 700 (including any actuators) can optionally be of the nature described in U.S. Pat. No. 9,327,441, the entire disclosure of which is incorporated herein by reference. In other embodiments, the feedblock can have one or more viscosity compensation devices of the type disclosed in U.S. Patent Application Pub. No. 2016/0031145, the entire disclosure of which is incorporated herein by reference. More generally, depending upon the applications intended for the feedblock, it can have any suitable viscosity compensation system or layer profiling devices, or none at all.

Another embodiment of the invention provides a method of using an extrusion device 10 to produce different layer arrangements. The extrusion device 10 has a body 20 and an adjustment valve 50. The method involves operating the extrusion device 10, while the adjustment valve 50 is in a first operative position, to produce a first layer arrangement. The adjustment valve 50 is then rotated from the first operative position to a second operative position, and the extrusion device 10 is operated (while the adjustment valve is in the second operative position) to produce a second layer arrangement. As noted above, the first and second layer arrangements are different.

The method may include delivering first, second, and third polymer flows respectively to first, second, and third inputs 118, 128, 138 of the body 20 continuously during rotation of the adjustment valve 50 from the first operative position to the second operative position (as well as during any other rotation of the/each adjustment valve from one operative position to another). Since the output configuration of the extrusion device 10 can be changed without having to shut down the extrusion line, the extruder(s) delivering polymer flows to the device can continue operating while the layer arrangement produced by the device is changed.

The illustrated adjustment valve 50 is rotated from the first operative position to the second operative position without removing any component of the extrusion device 10 and replacing such component with a different component. It is unnecessary, for example, to remove and replace flow inserts, diverters, plugs, flow spools, and/or selector plates before adjusting the extrusion device 10 from one output configuration to another. More generally, the extrusion device 10 can optionally be adjustable between different output configurations without disassembling any portion of the extrusion device (or at least any portion exposed to extrudate flow).

The rotational adjustment method of the present invention provides exceptional dynamic sealing. It also enables a particularly compact device profile. In the embodiments illustrated, rotation of the adjustment valve 50 is relative to the body 20 and about a rotation axis perpendicular to a machine direction (see arrow A in FIG. 8A) of the extrusion device 10.

The illustrated extrusion device 10 has three flow lines each extending through the body 20 and through the adjustment valve (50). During rotation of the adjustment valve 50, all three of these flow lines always remain open. This is also the case for each flow line in embodiments having fewer (only two) or more than three flow lines. When the adjustment valve rotates from one operative position to another, the path (or "route") of each flow line changes, and while a slight pressure increase may occur, the flow lines will never be closed entirely.

When the adjustment valve 50 is in the first operative position, a first set of extrudate channels 51, 52, 53 or 501, 502, 503 in the adjustment valve 50 is open to a plurality of intake conduits 110, 120, 130 or 310, 320, 330 and a plurality of output conduits 210, 220, 230 or 410, 420, 430 in the body 20, while a second set of extrudate channels 54, 55, 56 or 504, 505, 506 in the adjustment valve is closed off (and thus receives no flow) from the intake conduits and from the output conduits. When the adjustment valve 50 is in the second operative position, the second set of extrudate channels 54, 55, 56 or 504, 505, 506 is open to the intake conduits 110, 120, 130 or 310, 320, 330 and to the output conduits 210, 220, 230 or 410, 420, 430, while the first set of extrudate channels 51, 52, 53 or 501, 502, 503 is closed off (i.e., receives no flow) from the intake conduits and from the output conduits. It can thus be understood that methods of using the illustrated system may involve flowing extrude sequentially through "n" intake conduits of the body 20, then through "n" (not more) active extrudate channels of the or each adjustment valve, and then through "n" output conduits of the body. As will be appreciated, such methods do not involve flowing extrudate through closed extrudate channels of the or each adjustment valve, and need not involve flowing extrudate through any flushing channels while flow is being delivered to the active extrudate channels.

As noted above, some embodiments involve an adjustment valve 50 that is rotatable between first, second, and third operative positions. In such cases, the method further involves rotating the adjustment valve 50 from the second operative position to a third operative position, and operating the extrusion device 10 (while the adjustment valve is in the third operative position) to produce a third layer arrangement. The first, second, and third layer arrangements are different. When the adjustment valve 50 is in the third operative position, a third set of extrudate channels 507, 508, 509 in the adjustment valve 50 is open to the intake conduits 110, 120, 130 or 310, 320, 330 and to the output conduits 210, 220, 230 or 410, 420, 430, while the first and second sets of extrudate channels 501, 502, 503 and 504, 505, 506 are closed off from the intake conduits and from the output conduits. It is to be appreciated that, depending upon the intended applications, the adjustment valve 50 may have four or more operative positions. Thus, the present method may involve rotating the adjustment valve 50 among four or more operative positions.

The coextrusion device 10 used in the present method can be a feedblock of the nature described above with reference to FIGS. 9 and 10. Thus, the present method can involve extruding a first flow of extrudate through a central output conduit 300 while simultaneously extruding at least a second flow of extrudate through a coextrusion conduit 200. In many cases, the method involves extruding the first extrudate flow through the central output conduit 300 while simultaneously extruding two other extrudate flows respectfully through two coextrusion conduits 200. Thus, the first flow and the second flow(s) preferably are combined, at an intersection of the output conduit 300 and the coextrusion conduit(s) 200, to produce a multi-layer extrudate flow.

As noted above, the feedblock of FIGS. 9 and 10 has two flow adjusters 700, which preferably are each rotatable and wedge shaped. Thus, the present method can optionally involve rotating the flow adjusters 700 to simultaneously adjust the gap height of each coextrusion conduit 200 and a height of the central output conduit 300.

FIGS. 11-23 illustrate another embodiment of an extrusion device and, in particular, a flow diverter valve 1010. The flow diverter valve 1010 as described herein is used in an extrusion die system for forming a multi-layer polymeric film. The flow diverter valve 1010 can selectively redirect paths of polymer steams to a downstream feed block and/or extrusion die in order to alter the laminate configuration.

Referring to FIGS. 11-23, the flow diverter valve 1010 is adjustable between first and second output configurations. The flow diverter valve 1010, when in the first output configuration, produces extrudate having a first layer arrangement, and when in the second output configuration, produces extrudate having a second layer arrangement. In the embodiments illustrated, the output configuration of the flow diverter valve 1010 is changed without having to shut down the extrusion line. For example, one or more extruders delivering multiple polymer flows to the flow diverter valve 1010 can continue operating while the layer arrangement produced by the device is changed. The flow diverter valve 1010 is adjustable (e.g., from being configured to produce extrudate having a first layer arrangement to being configured to produce extrude having a second layer arrangement) without having to remove any component and replace it with a different component. More generally, the flow diverter valve 1010 is adjustable between different output configurations without having to disassemble any portion of the extrusion device.

In one embodiment, for example, for an extrusion die system configured to extrude a three component ABC film, the flow diverter valve 1010 can alter the paths of the A-stream material and the C-stream to alternate between an ABC and CBA configuration. The invention is not limited to ABC configuration, any particular alternative configuration may be used, BAC, CAB, etc. In alternative embodiments, the flow diverter valve 1010 is configured to supply polymer streams to a feed block and/or extrusion die to form a 4-layer film, 5-layer film, etc. The flow diverter valve 1010 is configured to alter the paths of two material streams out of three material, four streams, five material streams, etc.

As shown in FIGS. 11-14, the flow diverter valve 1010 includes a body 20 and an adjustment valve 1050 in the body 1020. The body 1020 has an outer surface 1022 and an elongate opening 1024 that extends along a first axis Y. The body 1020 also includes a set of input passages 26a-26c that extend from the outer surface 1022 through the body to the elongate opening 1024, and a set of output passages 1028a-1028c that extend through body from the elongate opening 1024 to the outer surface 1022. In the embodiments illustrated, the body 1020 has first 1026a, second 1026b, and third 1026c input passages are adapted to respectively receive first, second, and third polymer flows (e.g., from first, second, and third extruders). The first output passage 1028a, the second output passage 1028b, and the third output passage 1028c terminate along a common surface 1030 of the body 1020 as shown in FIG. 2. If desired, the body 1020 is provided with inputs to receive polymer flows from four or five, or even more, extruders. It is to be appreciated that the inputs is provided at various different locations on the body 1020 of the flow diverter valve 1010. Moreover, a single inlet can alternatively be provided to supply polymer to one or more flow lines of the extrusion device.

Figure 14:
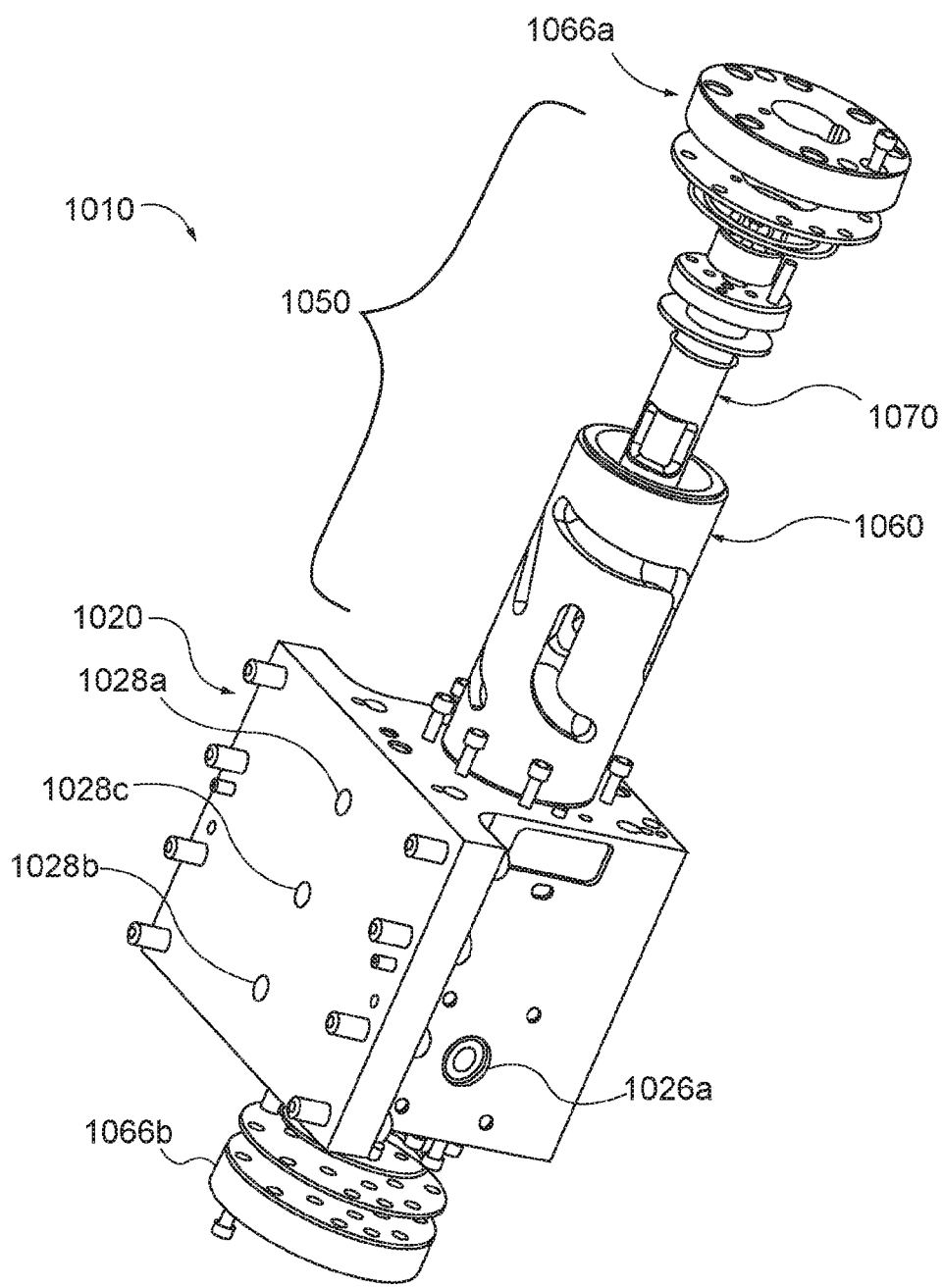
FIG. 14 is a perspective exploded view of the flow diverter illustrated in FIGS. 11-13.
Figure 15:
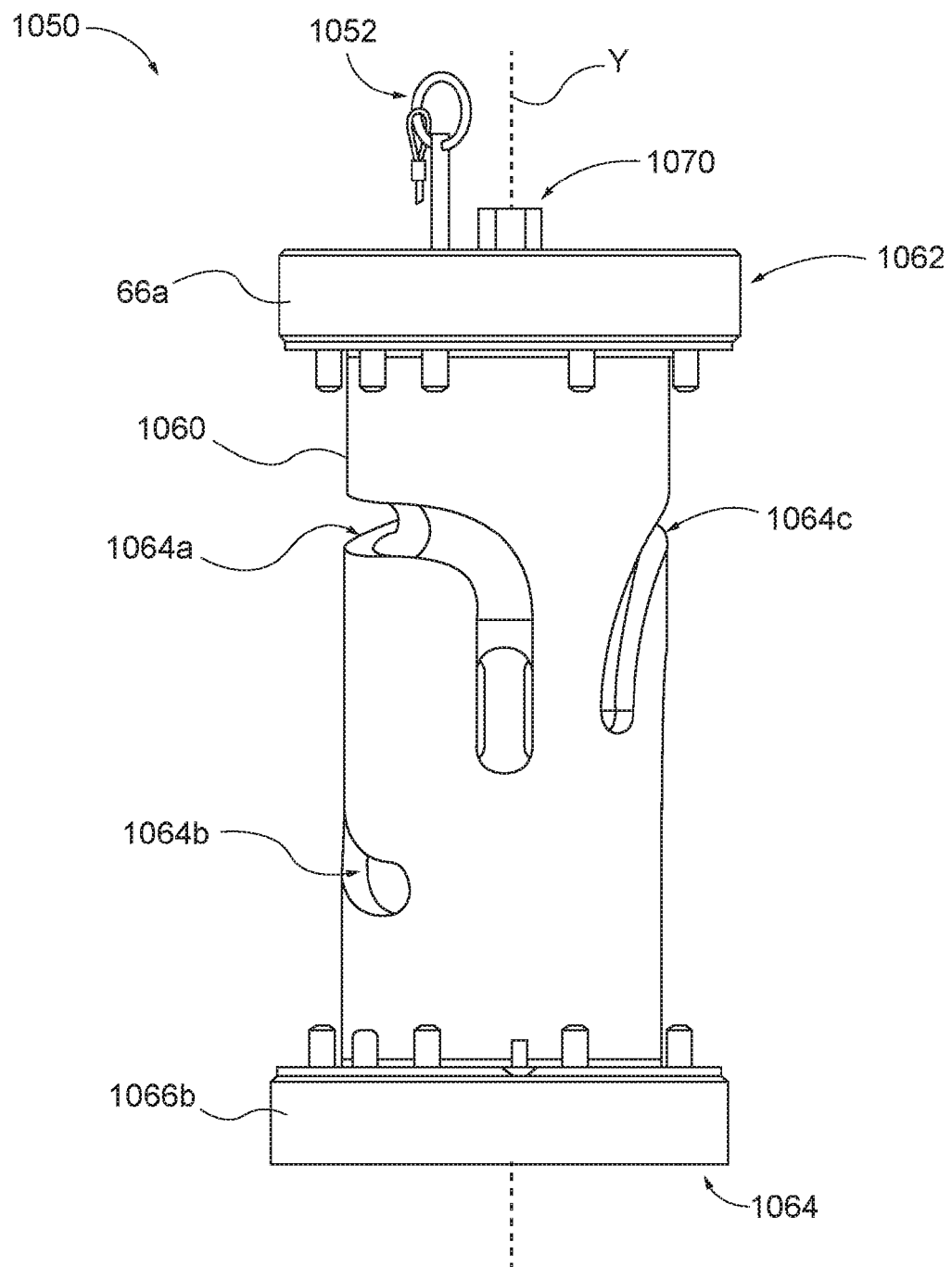
FIG. 15 is a side elevation view a spool assembly used in the flow diverter shown in FIGS. 11-15.
Figure 16:
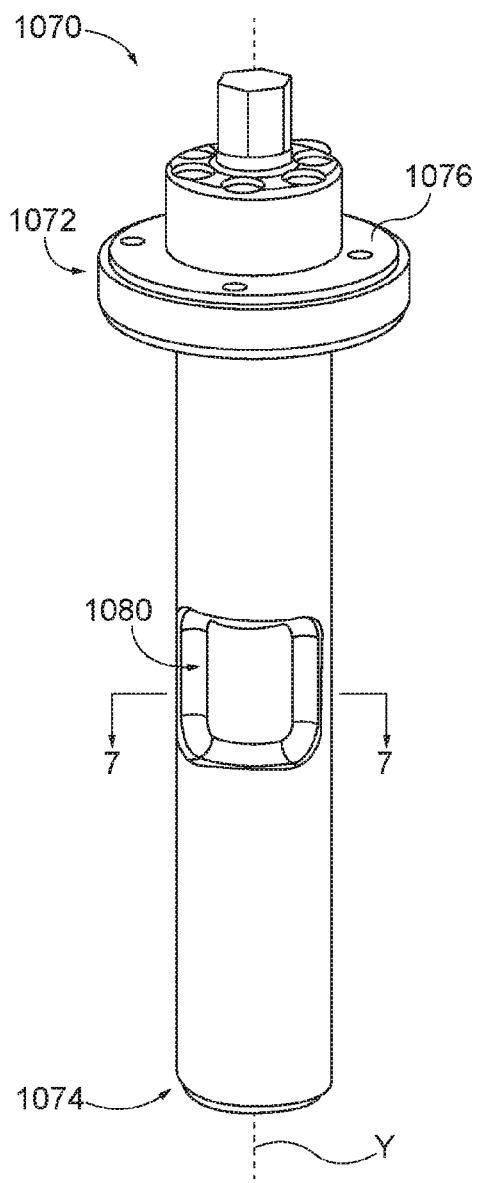
FIG. 16 is a perspective view a spool from the spool assembly shown FIG. 16.
Figure 17:
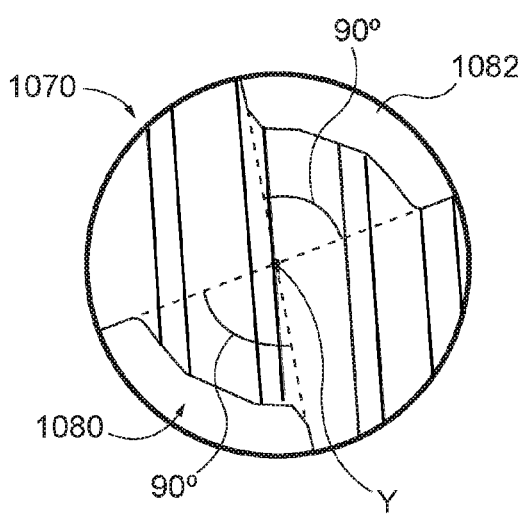
FIG. 17 is a cross-sectional view of the spool taken along line 6-6 in FIG. 6.
Figure 18:
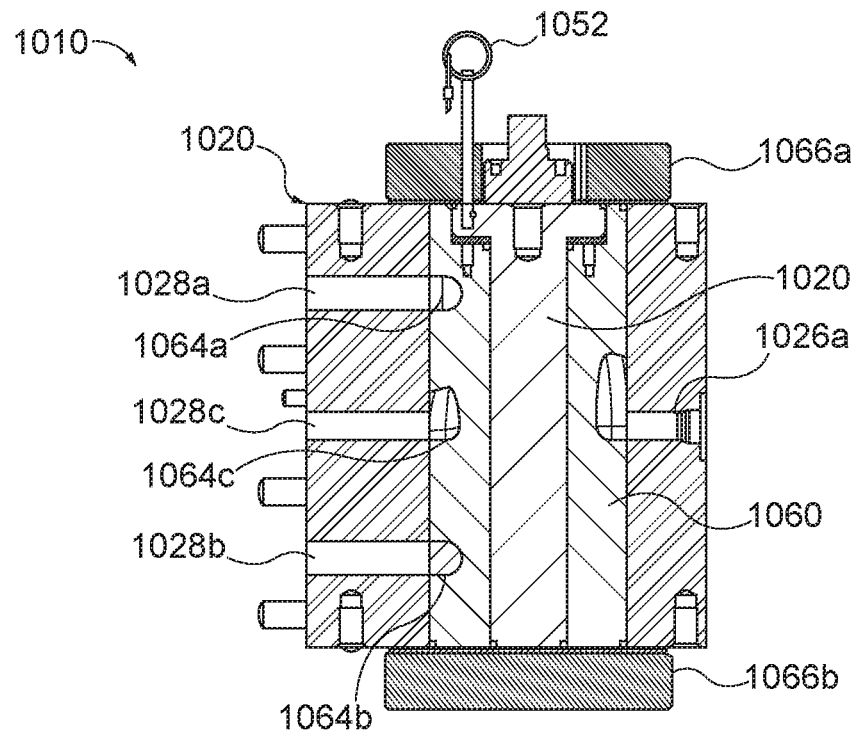
FIG. 18 is a cross-sectional side view of the flow diverter taken along line 8-8 in FIG. 13.
Figure 19:
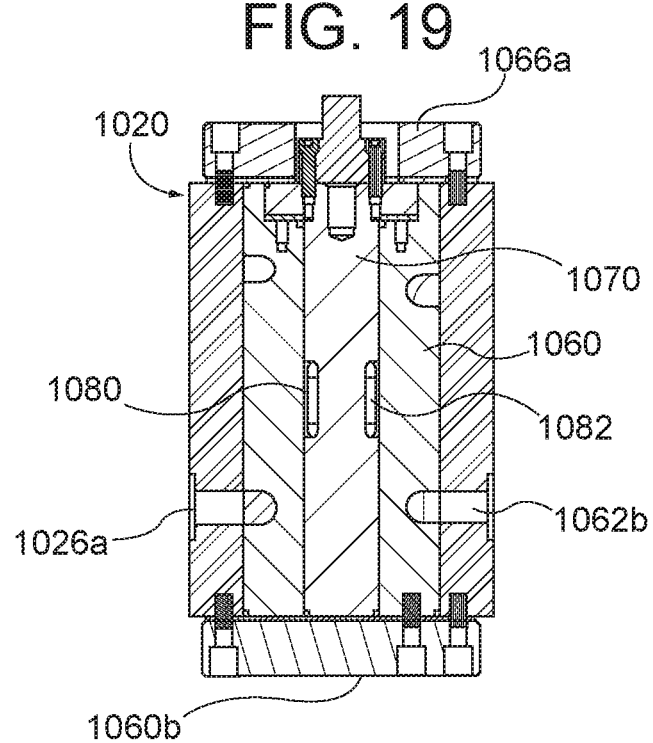
FIG. 19 is a cross-sectional side view of the flow diverter taken along line 9-9 in FIG. 13.
Figure 20:
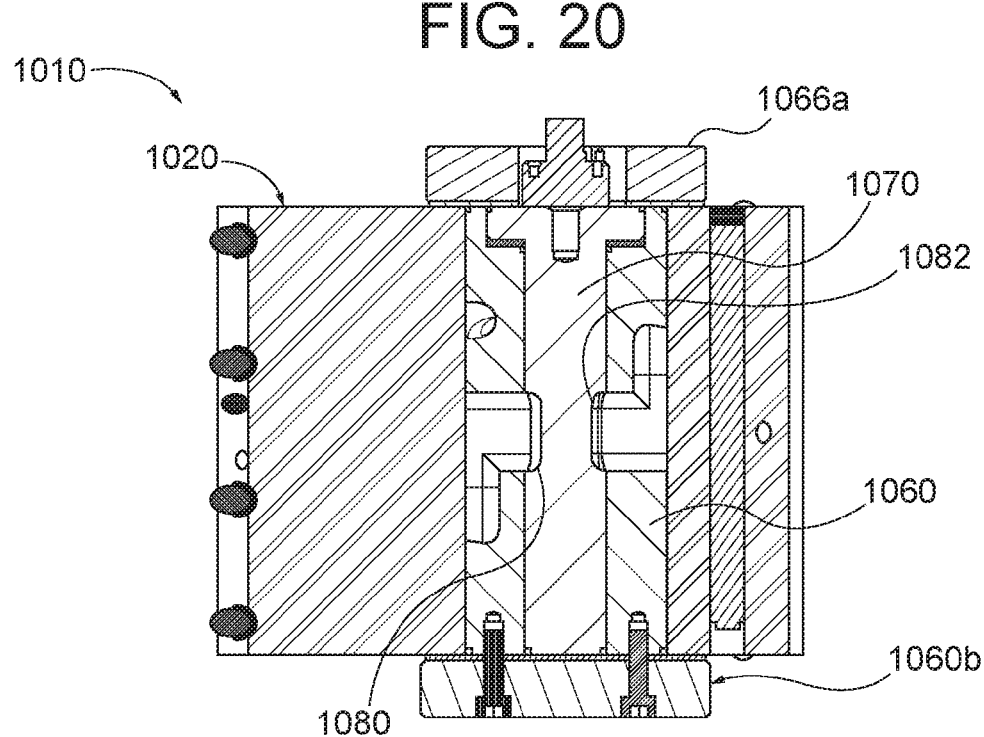
FIG. 20 is a cross-sectional side view of the flow diverter taken along line 10-10 in FIG. 13.
Figure 21:
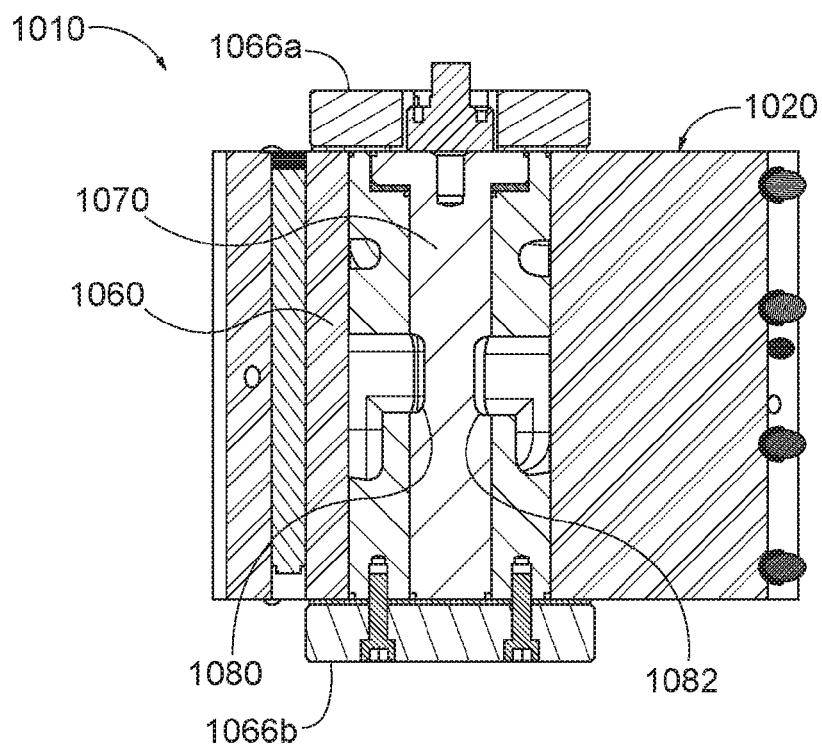
FIG. 21 is a cross-sectional side view of the flow diverter taken along line 11-11 in FIG. 13.

As shown in FIGS. 14 and 15, the flow diverter valve 1010 has an adjustment valve 1050 disposed in the elongate opening 1024 of the body 1020. The adjustment valve 1050 includes an outer body 1060 fixed to the body 1020, and a rotatable spool 1070 inside the outer body 1060. The outer body 1060 includes an outer surface 1062 and a set of channels 1064a-1064c that correspond to the input passages 1026a-1026c and the output passages 1028a-1028b of the body 1020 such that material entering the set of input passages 1026a-1026c travels through the set of channels 1064a-1064c to the set of output passages 1028a-1028c. A locking member 1052 is used to fix the rotational position of the monolithic spool 1070 within the outer body 1060.

Continuing with FIGS. 15 and 18-21, the outer body 1060 has a first end 1062, a second end 1064 opposite the first end 1062 along an first axis Y. The first end 1062 and second end 1064 each include a coupling 1066a and 1066b that fixes the outer body 1060 to the body 1020. The outer body 1060 has an elongate opening that extends therethrough within which the monolithic spool 1070 is positioned.

Referring to FIGS. 16-21, the monolithic spool 1070 has a first end 1072, a second end 1074 opposite the first end 1072 along an first axis Y. The first end 1072 may include a coupling 76 that rotationally attaches the monolithic spool 1070 to the outer body 1060. Thus, the monolithic spool 1070 can rotate relative to the outer body 1060. The monolithic spool 1070 includes a first recess 1080 and a second recess 1082 opposite to the first recess 1082. As illustrated, the first recess 1080 and the second recess 82 each extend around the spool along an arc of about 90°. In addition, the first recess 1080 and the second recess 1082 are diametrically opposite each other. The size and position of the recesses limit entrapment of material in the channels 64a-64c during use. For instance, each of the first recess 1080 and the second recess 1082 are at least partially aligned with at least one input passage 1026a-1026c and at least one output passage 1028a-1028c when the monolithic spool 1070 is in any rotational position about the first axis Y. Thus, regardless of the rotational position of the spool, polymer material can always flow through from the input passages 1026a-1026c through the channels 1064a-1064c along the outer body 1060 into the output passage 1028a-1028c. As illustrated, the spool is a monolithic body, which has the advantage of reducing part numbers over typical spools, and decreases the tools required to change the position of the spools.

The monolithic spool 1070 is rotated between first and second operative positions while the extruders continue delivering polymer flows to the first 1028a and second 1028b input passages of the body 1020. As illustrated, the monolithic spool 1070 is rotatable with respect to the outer body between a first position and a second position. The first position is where the first recess 1080 and the second recess 1082 aligns the set of channels 1064a-1064b with the set of input passages 1028a-1028b and the set of output passage 1028a-1028b in a first flow configuration. In the first flow configuration, the extrudate has a first layer arrangement. The second position is where the first recess 1080 and the second recess 1082 aligns the set of channels 1064a-1064b with the set of input passages 1026a-1026b and the set of output passages 1028a-1028c in a second flow configuration. In the second flow configuration, the extrudate has a second layer arrangement that is different from the first layer arrangement. As described above, the first and second recesses 1080, 1082 are positioned around the monolithic spool 1070 such that polymer material can pass through the set of channels 1064a-1064b as the monolithic spool 1070 transitions from the first position to the second position.

Figure 22:
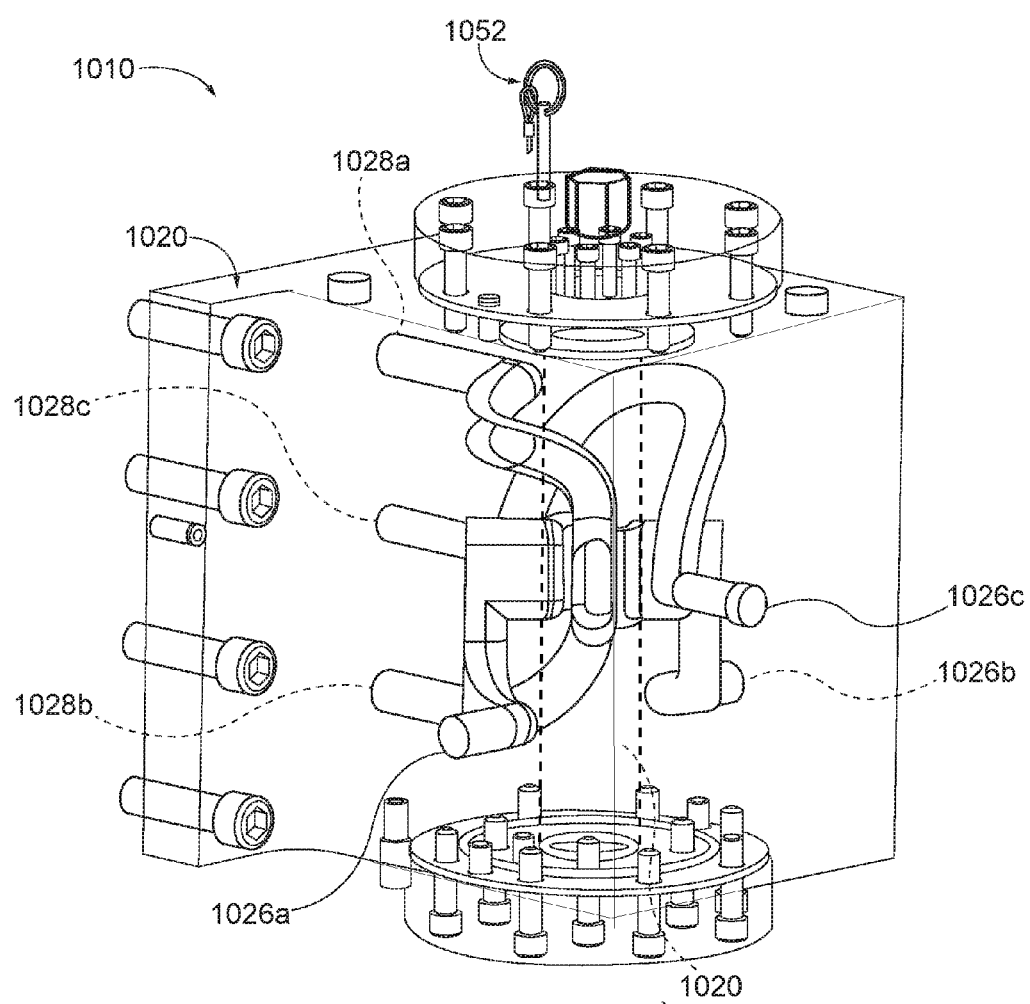
FIGS. 22 and 23 are top perspective partially transparent views of a flow diverter showing the spool in a first configuration and a second configuration, respectively.
Figure 23:
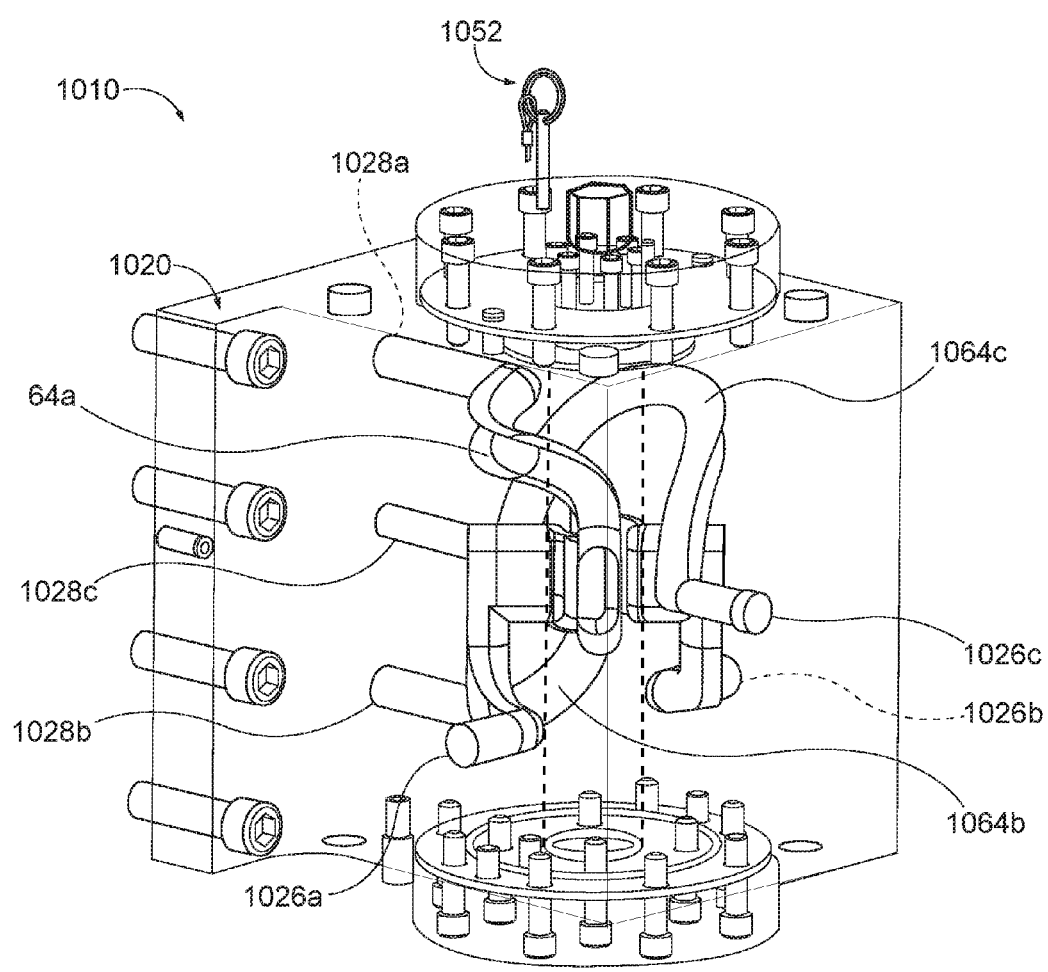

Referring to FIGS. 22-23, the extrusion die system is operated to form an extrudate with the first layer arrangement. The operator can remove the lock member 1052 from the adjustment valve 1050 and, using a tool, change the rotational position of the monolithic spool 1070 from the first position into the second position. Advantageously, as the rotational position of the monolithic spool 1070 changes, the location of the recesses 1080 and 1082 permit polymer to flow through the channels 1064a-1064b so that polymer is not entrapped in the spool assembly. When the monolithic spool 1070 is rotated into the second position, polymer flows are rerouted through the flow diverter valve 1010 to yield an extrudate with a second layer configuration. More specifically, as illustrated, when the monolithic spool 1070 is in the first position, the first channel 1064a is aligned with the first input passage 1026a and the first output passage 1028a. The second channel 1064b is aligned with the second input passage 1026b and the second output passage 1028b. And the third channel 1064a is aligned with the third input passage 1026c and the third output passage 1028c. When the monolithic spool 1070 is in the second position, the first channel 1064a is aligned with the first input passage 1028a and the second output passage 1028b. The second channel 1064b is aligned with the second input passage 1028b and the first output passage 1028a. The third channel 1064c is aligned with the third input passage 1026c and the third output passage 1028c.

The flow diverter valve 1010 has advantages of prior art diverter valves, such as the Hanson II diverter valve disclosed in U.S. Patent App. Pub. No. 2016/0243743. The Hanson II diverter valve lacks sealed spool halves thus creating leakage issues. The Hanson II diverter valve also has flow channels that would be difficult to machine without plugs and welding, creating manufacturing issues. The Hanson II diverter valve does not have the capability to allow for a core polymer to pass through. Thus, the Hanson II diverter valve has a flow channel layout that is difficult to match existing feed block designs. Furthermore, the Hanson II diverter valve has outlet locations that would require a separate distribution block of some kind to feed current feed blocks. The flow diverter valve 1010 in the present application addresses the drawbacks of the Hanson II device. Specifically, a monolithic spool 1070 has fewer manufacturing complexities. The third input passage 1026c, third channel 1064, and third output passage 1028c allow for core layer polymer to pass through. The inputs and outputs of the flow diverter valve 1010 may be arranged to match to existing feed blocks, creating flexibility in number of different extrusion systems the flow diverter valve 1010 can be used in.

It will be appreciated by those skilled in the art that various modifications and alterations of the present disclosure can be made without departing from the broad scope of the appended claims. Some of these have been discussed above and others will be apparent to those skilled in the art. The scope of the present disclosure is limited only by the claims.

The following detailed description is exemplary in nature and is not intended to limit the scope, applicability, or configuration of the invention in any way. The description provides practical illustrations for implementing certain preferred embodiments of the invention. Examples of constructions, materials, dimensions, and manufacturing processes are provided for selected elements; all other elements employ that which is known to those of ordinary skill in the field of the invention. Those skilled in the present art will recognize that many of the given examples have a variety of suitable alternatives.

What is claimed is:

1. A flow diverter for an extrusion die configured to form a laminate, the flow diverter comprising:
   a body having an outer surface, an elongate opening that extends along a first axis, a set of input passages including at least three input passages that each extend from said outer surface through said body to said elongate opening, and a set of output passages including at least three output passages that each extend through said body from said elongate opening to said outer surface; and
   an adjustable valve positioned in said elongate opening, said adjustable valve having:
   a) an outer body fixed to said body, said outer body including a set of channels including at least three channels open to said input passages and said output passages such that material entering said set of input passages travels through said set of channels to said set of output passages; and
   b) a monolithic spool including a first recess and a second recess opposite to said first recess, wherein said spool is rotatable with respect to said outer body between a first position where said first recess and said second recess align at least two channels of said set of channels with at least two input passages of said set of input passages and at least two output passages of said set of output passage in a first flow configuration, and a second position where said first recess and said second recess align another at least two channels of said set of channels with said at least two input passages of said set of input passages and said at least two output passages of said set of output passages in a second flow configuration, and wherein said first flow configuration is different from said second flow configuration.

2. The flow diverter of claim 1, wherein said first and second recesses are positioned around said spool such that material can pass through said set of channels when said spool transitions from said first position to said second position.

3. The flow diverter of claim 1, wherein said at least three input passages include a first input passage, a second input passage, and a third input passage,
   wherein said at least three output passages include a first output passage, a second output passage, and a third output passage,
   wherein said at least three channels include a first channel, a second channel, and a third channel,
   wherein in said first flow configuration, said first channel is aligned with said first input passage and said first output passage, said second channel is aligned with said second input passage and said second output passage, and said third channel is aligned with said third input passage and said third output passage, and
   wherein in said second flow configuration, said first channel is aligned with said first input passage and said second output passage, said second channel is aligned with said second input passage and said first output passage, and said third channel is aligned with said third input passage and said third output passage.

4. The flow diverter of claim 1, wherein said first recess and said second recess each extend around said spool about 90°.

5. The flow diverter of claim 1, wherein each of said first recess and said second recess are at least partially aligned with at least one input passage and at least one output passage when said spool is in any rotational position about said first axis.

6. The flow diverter of claim 1, wherein said at least three channels of said outer body includes a first channel, a second channel, and a third channel, and said third channel of said outer body is fluidly isolated from said spool.

* * * * *